United States Patent
Tiagi

(10) Patent No.: US 12,284,251 B2
(45) Date of Patent: Apr. 22, 2025

(54) MODIFICATION OF A SOCKET NETWORK NAMESPACE IN RESPONSE TO A SYSTEM CALL INTERCEPTION

(71) Applicant: NETFLIX, INC., Los Gatos, CA (US)

(72) Inventor: Alok Tiagi, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/323,133

(22) Filed: May 24, 2023

(65) Prior Publication Data
US 2024/0396974 A1    Nov. 28, 2024

(51) Int. Cl.
*H04L 67/141* (2022.01)
*G06F 9/54* (2006.01)

(52) U.S. Cl.
CPC ............ *H04L 67/141* (2013.01); *G06F 9/547* (2013.01)

(58) Field of Classification Search
CPC ............................... H04L 67/141; G06F 9/547
See application file for complete search history.

(56) References Cited

U.S. PATENT DOCUMENTS

| | | | | |
|---|---|---|---|---|
| 2012/0066695 A1* | 3/2012 | Berezansky | .......... | H04L 61/251 719/328 |
| 2012/0254893 A1* | 10/2012 | Pope | .......... | G06F 9/545 719/318 |
| 2012/0272022 A1* | 10/2012 | Wang | .......... | G06F 9/545 711/E12.103 |
| 2013/0205035 A1* | 8/2013 | Chen | .......... | H04L 61/251 709/230 |
| 2021/0218750 A1* | 7/2021 | Wells | .......... | G06F 9/541 |

OTHER PUBLICATIONS

Jonathan Corbet, "Deferring seccomp decisions to user space", https://lwn.net/Articles/756233/, Jun. 2, 2018, 7 pages.
Jonathan Corbet, "Grabbing file descriptors with pidfd_getfd()", https://lwn.net/aArticles/808997/, Jan. 9, 2020, 6 pages.
Sargun Dhillon, "Add seccomp notifier ioctl that enables adding fds", https://lkml.org/lkml/2020/6/2/1139, June 2, 20202, 2 pages.
Cilium, "eBPF-based Networking, Observability, and Security", https://cilium.io/, Aug. 23, 2021, 3 pages.
Tayga, "Simple, no-fuss NAT64 for Linux", http://www.litech.org/tayga/, Aug. 23, 2021, 2 pages.

* cited by examiner

*Primary Examiner* — David R Lazaro
*Assistant Examiner* — Xiang Yu
(74) *Attorney, Agent, or Firm* — Artegis Law Group, LLP

(57) ABSTRACT

Various embodiments of the present application set forth a computer-implemented method that includes intercepting a first system call from a client application, wherein the system call comprises a request to connect to a target destination; obtaining a file descriptor for a socket associated with the request to connect from the client application; modifying a network namespace for the socket; and causing a connection to be established from the client application to the target destination.

20 Claims, 11 Drawing Sheets

MODIFICATION OF A SOCKET NETWORK NAMESPACE IN RESPONSE TO A SYSTEM CALL INTERCEPTION

BACKGROUND

Field of the Various Embodiments

The various embodiments relate generally to computer science and, more specifically, to intercepting connection system calls and modifying associated sockets.

Description of the Related Art

A computing system executes various applications, such as web browsers, media players, file management applications, server software, and the like, that communicate with various destinations outside of the computing system. To communicate with a destination, a given application establishes a direct connection to the destination and manages its connection to the destination. However, in some cases, rather than directly connecting to a destination, the connection from an application to the destination needs to be routed or otherwise modified.

One approach to modifying the destination of messages transmitted by an application is to use network address translation to modify the network address information included in a packet during transit. Network address translation provides a mapping between different IP addresses, e.g., from an intended destination to an alternate destination. However, one drawback of this approach is that the modification occurs on a packet-by-packet basis. Each packet transmitted from an application needs to be monitored and, if necessary, modified. Therefore, using network address translation introduces significant processing overheads and packet transmission delays.

Another approach to modifying the destination of messages transmitted by an application is to use a proxy to monitor communications between the application and various destinations. The proxy application can intercept and redirect requests to different destinations. However, similar to network address translation, one drawback of this approach is that the modification occurs on a request-by-request basis. Each message transmitted from an application needs to be monitored and, if necessary, redirected. Therefore, using a proxy also introduces significant processing overheads and packet transmission delays.

As the foregoing illustrates, what is needed in the art are more effective techniques for modifying client connections to external destinations.

SUMMARY

Various embodiments of the present application set forth a computer-implemented method that includes intercepting a first system call from a client application, wherein the system call comprises a request to connect to a target destination; obtaining a file descriptor for a socket associated with the request to connect from the client application; modifying a network namespace for the socket; and causing a connection to be established from the client application to the target destination.

At least one technological advantage of the disclosed techniques relative to the prior art is that, with the disclosed techniques, a connection from a client application to an external destination is modified more efficiently compared to prior art techniques. In particular, a connection system call made by a client application is modified by a manager application to support a connection to a destination not originally supported by a client. For example, for client applications that support an IPv6 network exclusively, the manager application can replace the network namespace of a socket (associated with the connection system call) to an IPv4 transition namespace that is assigned an IPv4 address. Thereafter, executing in the IPv4 transition namespace, a client application can connect to and receive connections from destinations with an IPv4 address. Accordingly, using the disclosed techniques, packets and/or messages from the client application do not have to be monitored and re-routed individually at the packet level, which results in less processing overhead and lower packet transmission latency relative to conventional techniques.

Furthermore, replacing the network namespace of the socket obtained by the client application preempts the need for the manager application to create separate additional sockets used to bridge the connection between the client application and the destination. Accordingly, using the disclosed techniques prevents the need to maintain an exhaustive list of socket options to copy over to additional sockets created by the manager application and also precludes any inconsistencies in the system resulting from creating multiple sockets to support a single connection. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
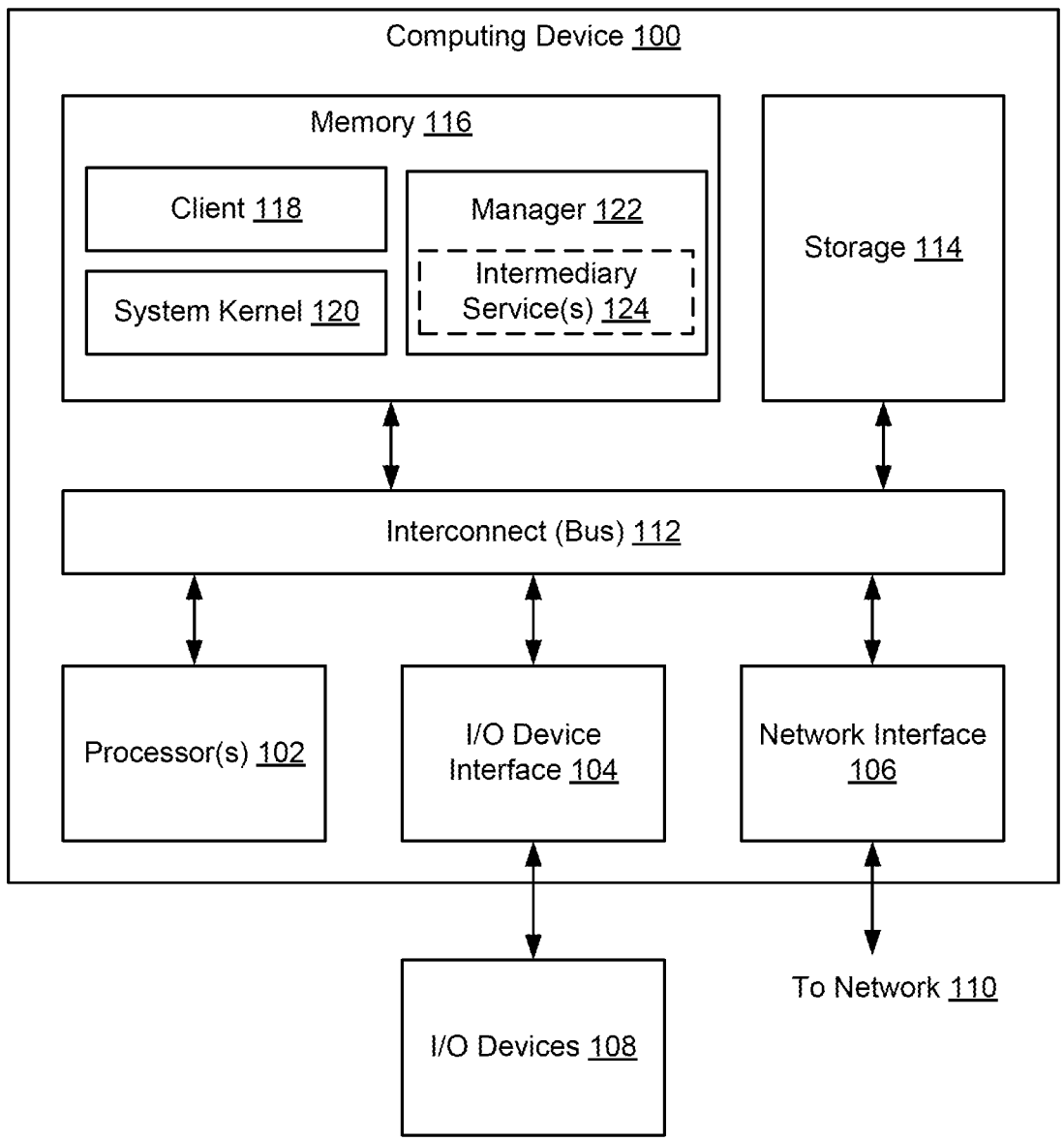
FIG. 1 is a conceptual illustration of a computing device 100 configured to implement one or more aspects of the present disclosure.

In the following description, numerous specific details are set forth to provide a more thorough understanding of the various embodiments. However, it will be apparent to one of skill in the art that the inventive concepts may be practiced without one or more of these specific details.

Overview

To communicate with a destination, a given application typically establishes a direct connection to the destination and manages its connection to the destination. However, in some cases, rather than directly connecting to a destination, the connection from an application to the destination needs to be routed or otherwise modified.

As an example, in order to utilize networking functionality not implemented in the application or to receive enhanced connection management services, the application may instead connect to a service mesh. A service mesh is a software component that executes on the computing system that provides and manages networking functionality, features, and services on behalf of the connected application. A given application connects to the service mesh, and the service mesh then connects to the intended destination of the given application.

As another example, in order to connect to and communicate with the various destinations, a given application is assigned an external IP address. IP addresses utilize two different protocols, IPv4 and IPv6. Because IPv6 addresses are more numerous than IPv4 addresses, an application may be assigned an IPv6 address. However, generally, an application using an IPv6 address cannot establish a connection to a destination that is using an IPv4 address. For example, a client application (also referred to herein as a "container") may be operating in an IPv6 only network. Therefore, messages from the application to a destination using an IPv4 address may generally need be re-routed to a different destination.

Prior art techniques handle re-routing or re-directing messages by monitoring communications between the application and the destination, identifying messages that should be re-routed, and re-routing the messages accordingly. However, the monitoring and re-routing must be performed continuously and on every message that is transmitted by the application. Thus, prior art approaches introduce significant processing overhead and message transmission delays. Additionally, if the monitoring and re-routing mechanism fails, then message transmission via established communications will also fail.

In contrast, the disclosed techniques enable a manager to re-route messages more efficiently by intercepting and modifying a connection system call. The modified connection system call establishes a connection from an application using a different route (e.g., by swapping the namespace of a socket from an IPv6 only network to a transition namespace that supports IPv4 addresses). Messages from the application via the connection are automatically re-routed without having to monitor or modify each message. Accordingly, using the disclosed techniques results in less processing overhead and lower packet transmission latency relative to conventional techniques.

System Call Interception and Socket Modification

FIG. 1 is a conceptual illustration of a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106 connected to a network 110.

Computing device 100 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative in that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing embodiment executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Client 118, system kernel 120, manager 122, and one or more intermediary services 124 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs and other program instructions that can be executed by processing unit(s) 102 and application data associated with said software programs, including client 118, system kernel 120, and manager 122. The manager 122 can include one or more intermediary services 124.

Client 118 can be any software program or application that executes on computing device 110. As noted above, a client may also be referred to herein as a "container." In some embodiments, client 118 is configured to issue various network-related system calls, such as socket requests to obtain sockets for communicating with various destinations and connection requests to establish connections to the destinations using the obtained sockets.

In some embodiments, manager 122 receives an intercepted system call and modifies the intercepted system call. Modifying the intercepted system call can include, for example, modifying the values of one or more parameters of the system call, replacing or modifying one or more objects specified in the system call, replacing or modifying the output of the system call, replacing or modifying the return value of the system call, and the like. Although examples are described below with reference to connection system calls, any type of system call can be intercepted and/or modified. The modifications to an intercepted system call may vary depending on the particular intercepted system call. For example, a system call for obtaining the address of a peer connected to a specified socket could be modified to return a virtual IP address corresponding to a real IP address that the socket is connected to, rather than the real IP address.

In some embodiments, the intercepted system call comprises a connection request. The connection request specifies a target destination and a socket for connecting to the target destination. In some embodiments, manager 122 generates a modified connection request. For example, a modified connection request can specify a different destination. Messages sent by client 118 to the target destination using the socket connection would instead be transmitted to the different destination. For example, the target destination could be a destination that is external to computing device 100. Manager 122 replaces the external destination specified in the connection request with an internal destination, such as a service mesh or other intermediary service 124. After the modified connection request is established, messages transmitted by client 118 to the external destination are routed to the internal destination. Alternatively, manager 122 could replace the external destination with a different external destination. For example, a plurality of external destinations could be associated with the same service or functionality, such as providing the same content. Manager 122 could select a different external destination from the plurality of external destinations to provide load-balancing between the plurality of external destinations.

In some embodiments, manager 122 accesses one or more rules, policies, and other routing information that indicate whether and how to modify various connection requests. The routing information could specify, for example, alternate addresses associated with different destination addresses, applications whose functionality should be managed by a service mesh, destination addresses whose communications should be managed by a service mesh, available routes to different destination addresses, and the like. The one or more rules, policies, and other routing information could be obtained from any number or type of different data sources. In some embodiments, the one or more rules, policies, and other routing information are stored by computing device 100, for example, in storage 114 and retrieved by manager 122 when evaluating an intercepted connection request. In some embodiments, to evaluate one or more rules and/or policies, manager 122 requests and/or retrieves routing information related to the one or more rules and/or policies. For example, manager 122 could determine, based on current routing information, whether a target destination address is reachable. Manager 122 could select an alternate destination address if the target destination address is not currently reachable or available.

As noted above, the manager 122 can comprise one or more intermediary services 124. The one or more intermediary services 124 include various software programs and/or other program instructions (e.g., external to client 118) that provide functionality for interacting with client 118 and/or destinations to which client 118 communicates. In some embodiments, the one or more intermediary services 124 include a service mesh. The service mesh is configured to facilitate communications between applications, such as client 118, and various destinations. For example, the service mesh could perform services such as network routing, throughput monitoring, load-balancing, authenticity verification, confidentiality, and so forth.

In some embodiments, resources on computing device 100 are partitioned into a plurality of namespaces. Client 118 executes in a namespace that is assigned an IPv6 address. Client 118 can only connect to and receive connections from destinations with an IPv6 address, and cannot connect to or receive connections from destinations with an IPv4 address. The one or more intermediary services 124 include an IPv4 transition namespace that is assigned an IPv4 address. Applications executing in the IPv4 transition namespace can connect to and receive connections from destinations with an IPv4 address. As discussed in further detail below, the IPv4 transition namespace can be used to establish egress connections from applications executing in an IPv6 namespace to destinations with an IPv4 address.

System kernel 120 is an operating system kernel of computing device 100. System kernel 120 performs system functions such as managing hardware devices including storage 114, I/O device interface 104, and network interface 106. System kernel 120 also provides process and memory management models for client 118, and manager 122. In some embodiments, system kernel 120 receives system calls requesting kernel level services from the operating system of computing device 100, such as requests to create communication endpoints (e.g., sockets) and requests to connect communication endpoints to specified destinations, from applications executing on computing device 100, such as client 118. System kernel 120 performs, or attempts to perform, the function requested in the system call. Additionally, system kernel 120 could notify the requesting application whether the requested function was performed successfully. For example, system kernel 120 could receive a request from client 118 to establish a connection to a target destination. System kernel 120 establishes the connection and sends a notification to client 118 indicating that the connection was successfully established.

In some embodiments, system kernel 120 monitors system calls made by applications executing on computing device 100, such as client 118. System kernel 120 determines whether to intercept the system call and if so, intercepts the system call. System kernel 120 provides the system call to another application, such as manager 122 and/or notifies the other application of the system call. In some embodiments, system kernel 120 determines whether to intercept a system call based on whether the type of system call is included in a set of one or more specific system calls. For example, system kernel 120 could be configured to intercept one or more of: socket, connect, sendto, recvfrom, sendmsg, recvmsg, bind, accept, listen, accept4, getsockname, and/or getpeername. In some embodiments, system kernel 120 determines which system calls to intercept by using system call filtering to filter incoming system calls. For example, system kernel 120 could use a seccomp BPF (secure computing with Berkley Packet Filter) program to filter and intercept the one or more specified system calls. The seccomp BPF program could include rules that specify which system calls should be intercepted.

Figure 2A:
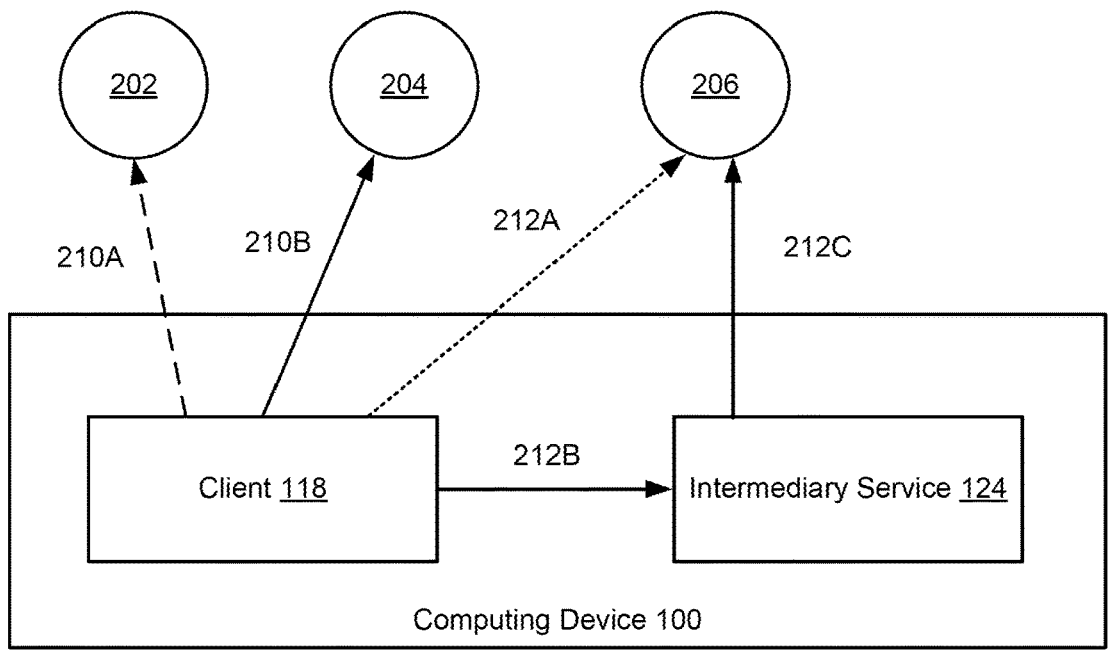
FIGS. 2A and 2B illustrate modified connections between the client of FIG. 1 and one or more target destinations, according to various embodiments of the present invention.

FIG. 2A illustrates example modified connections between client 118 and target destinations, according to various embodiments. As shown in FIG. 2A, client 118 can request connections to a plurality of destinations, e.g., destination 202, destination 204, and destination 206. In some embodiments, when client 118 requests a connection to a destination, manager 122 modifies the connection request to establish a connection to a different destination.

As an example, client 118 sends a connection request to establish connection 210A to destination 202. Manager 122 determines that client 118 should instead connect to destination 204. Manager 122 modifies the connection request to establish connection 210B from client 118 to destination 204. Messages transmitted by client 118 are transmitted via connection 210B to destination 204.

As another example, client 118 sends a connection request to establish connection 212A to destination 206. Manager 122 determines that client 118 should communicate with destination 206 via an intermediary service 124, such as a service mesh. Manager 122 modifies the connection request to establish connection 212B from client 118 to intermediary service 124. Intermediary service 124 then establishes connection 212C to destination 206. Messages transmitted by client 118 are transmitted via connection 212B to intermediary service 124. Intermediary service 124 can perform various processing operations on the messages and/or forward the messages to destination 206 via connection 212C.

Figure 2B:
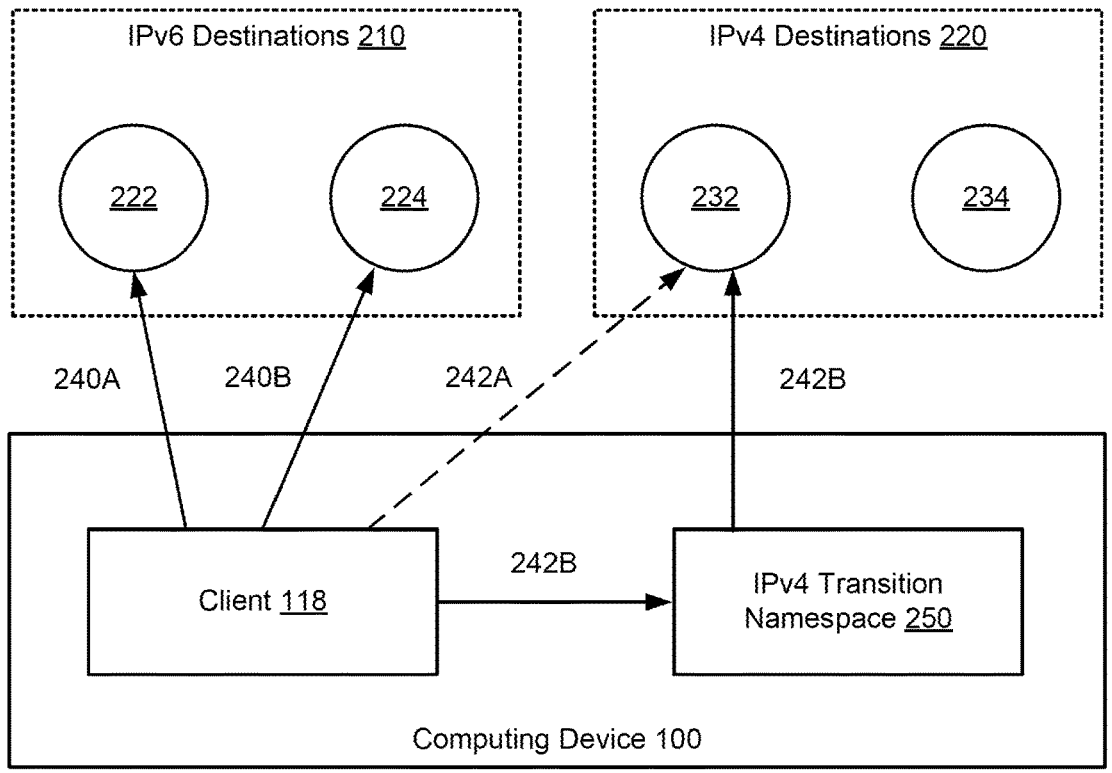

FIG. 2B illustrates an example of modified connections between client 118 and target destinations, according to various embodiments. As shown in FIG. 2B, IPv6 destinations 220 include destination 222 and destination 224, and IPv4 destinations 230 include destination 232 and destination 234. If client 118 executes in an IPv6 namespace, then client 118 can communicate with the IPv6 destinations 220. For example, client 118 communicates with destination 222 via connection 240A and with destination 224 via connection 240B. However, IPv6 addresses are not backwards compatible, so client 118 cannot communicate directly with IPv4 destinations 230. In some embodiments, when client 118 requests a connection to an IPv4 destination 230, manager 122 modifies the connection request to establish a connection in an IPv4 transition namespace 250. For example, client 118 sends a connection request to establish connection 242A to destination 232. Manager 122 determines that destination 232 is an IPv4 destination. Manager 122 modifies the connection request to establish connection 242B using transition namespace 250.

Creating a Separate Socket for Connecting to a Target Destination

As noted above, in some embodiments, manager 122 intercepts a connection request and generates a modified connection request by creating an additional socket to facilitate the connection with a target destination. In some embodiments, manager 122 creates a different socket for connecting to the target destination or the different destination. The different socket may be a different connection type and/or created in a different namespace. Manager 122 generates a modified connection request that specifies the different socket. In some embodiments, the socket specified in the connection request is a socket that is used to connect to external destinations and/or that cannot be used for internal or local destinations. Manager 122 creates a new socket that is used to connect to local destinations and/or that cannot be used for external destinations. The new socket may be more efficient than the original socket when used to connect to local destinations. For example, the socket specified in the connection request could be a sock_stream socket generated using a socket( ) system call. Manager 122 determines that the target destination or the different destination is a local destination, and creates a second socket using a socketpair( ) system call. Manager 122 generates a modified connection request that specifies the second socket. As another example, client 118 could execute in a first namespace. When client 118 creates a socket, the socket is created in the first namespace. Manager 122 could determine, based on the target destination or the different destination, that a second namespace should be used. Manager 122 switches to or executes in a second namespace, for example through intermediary service 124, and creates a second socket in the second namespace. Manager 122 generates a modified connection request that specifies the second socket.

Figure 3:
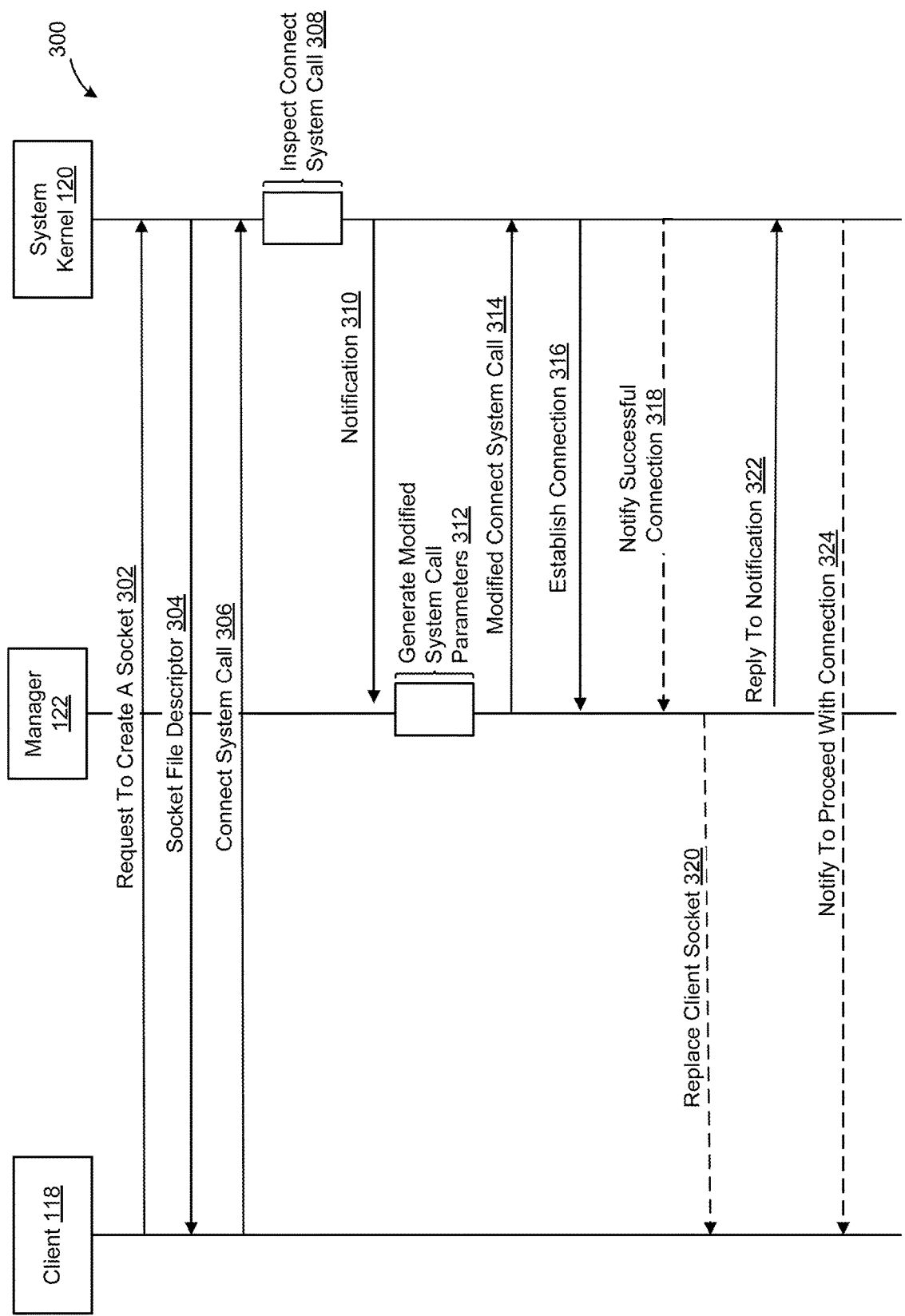
FIG. 3 illustrates an example call flow diagram showing interactions between various components of a computing device, according to various embodiments of the present invention.

FIG. 3 illustrates an example call flow diagram showing interactions between various components of computing device 100, according to various embodiments of the present invention. One or more components of the computing device 100 may perform various operations for intercepting and modifying system calls made by a client application, such as connect and socket system calls. Although the interactions between the various components are shown in an order, persons skilled in the art will understand that the interactions may be performed in a different order, interactions may be repeated or skipped, and/or may be performed by components other than those illustrated in FIG. 3.

Client 118 sends a request to create a socket 302 to system kernel 120. The socket request 302 can include one or more parameters associated with the socket, such as a socket type, a communication domain, and a communication protocol. For example, client 118 sends a socket( ) call to system kernel 120.

In response to receiving the socket request 302, system kernel 120 creates a socket for communications by client 118. The socket is associated with a file descriptor 304. The file descriptor 304 is a unique identifier that is used to identify the socket when specifying input parameters for a system call. System kernel 120 provides the socket file descriptor 304 to client 118.

Client 118 uses the socket file descriptor 304 when generating a request to establish a connection to a target destination. Client 118 generates and sends a connection system call 306. The connection system call 306 can include parameters associated with the requested connection, such as a socket for the connection and a target destination. The socket for the connection is identified using the socket file descriptor 304. For example, client 118 sends a connect(fd, addr) call to system kernel 120, where fd represents the socket file descriptor 304 and addr represents an address of the target destination.

System kernel 120 receives the connection system call 306 and performs one or more operations 308 to inspect the connection system call and determine whether to handle the connection system call normally or to intercept the connection system call. In some embodiments, the inspection is performed by a software program that is configured to filter the system calls that should be intercepted. In some embodiments, determining whether to intercept the connection system call is based on one or more of the type of system call, the client that generated the system call, and/or a target destination specified in the system call.

System kernel 120 determines that the connection system call 306 should be intercepted, and sends a notification 310 to manager 122. In some embodiments, the notification indicates one or more of the client that generated the system call (e.g., client 118), the type of system call (e.g., connect( ) call), and/or the one or more parameters included in the system call (e.g., the file descriptor and the target destination). Manager 122 is configured to intercept and/or modify intercepted system calls. In response to receiving the notification, manager 122 performs one or more operations 312 to generate modified system call parameters based on the system call 306.

In some embodiments, generating the one or more modified system call parameters includes sending a request to create a socket to system kernel 120 and receiving, from system kernel 120, a file descriptor for a new socket. The one or more modified system call parameters include the file descriptor for the new socket. For example, if a target destination or a modified target destination is a local destination, then manager 122 can use a socketpair( ) call to create a local socket pair, and replace the socket generated by a socket( ) call with one of the sockets in the socket pair. As another example, rather than obtaining the socket created by client 118, manager 122 can use a socket( ) call to create a new socket for establishing a connection to a new target address.

In some embodiments, client 118 executes in a namespace that is assigned an IPv6 address. If the address of the target destination is an IPv4 address, then manager 122 creates a new socket in an IPv4 namespace. For example, manager 122 executes in or switches execution to an IPv4 transition namespace and sends a request to create a new socket to system kernel 120 while in the IPv4 transition namespace. In some embodiments, manager 122 switches to an IPv4 transition namespace by sending a setns(fd, CLONE_NEWNET) call to system kernel 120, where fd represents a file descriptor associated with a target namespace (e.g., the IPv4 transition namespace), and CLONE_NEWNET indicates that the target namespace is a network namespace.

In some embodiments, generating the one or more modified system call parameters includes obtaining the socket file descriptor 304 from the client 118 and receiving the socket file descriptor 304 for the socket established by the prior socket request 302 from the client. In some embodiments, to obtain socket file descriptor 304, manager 122 calls pidfd_getfd(pidfd, targetfd), where targetfd represents a file descriptor associated with a target file descriptor (i.e., socket file descriptor 304), and pidfd represents a file descriptor associated with a process (i.e., client 118) that opened the target file descriptor. pidfd_getfd( ) is a system call for extracting a copy of a target file descriptor from another process. When the pidfd_getfd( ) call is executed, the local file descriptor identifier associated with the target file descriptor is returned. The local file descriptor identifier can be used to issue further system calls that operate on the target file descriptor, e.g., the client socket. The client socket can be used in a modified system call by the manager 122 and/or replaced with a new socket created by manager 122. In some embodiments, the manager 122 obtains socket options associated with the client socket and applies the socket options to the new socket.

In some embodiments, determining the one or more modified system call parameters includes determining a new target destination address for the connection system call 306. For example, the connection system call 306 from client 118 could specify an address corresponding to an external destination, and manager 122 determines a new target destination address that is for a service mesh or other intermediary service 124 that is internal to computing device 100. As another example, the specified address could be a virtual IP address, and manager 122 determines an actual IP address corresponding to the virtual IP address. As a third example, the specified address could be included in a plurality of addresses that correspond to the same service. Manager 122 determines that a different address included in the plurality of addresses should be used instead of the specified address, for example, for load balancing or if the specified address is unavailable. The one or more modified system calls include the new target destination address.

The manager 122 sends a modified connection system call 314 to the system kernel 120 that specifies the one or more modified system call parameters. The system kernel 120 establishes a connection 316 based on the modified system call parameters, and sends a notification 318 to manager 122 notifying the manager 122 of the successful connection. In some embodiments, the modified connection system call 314 specifies a file descriptor of a socket for establishing the connection. The specified file descriptor could be file descriptor 304 that manager 122 obtained from client 118 or a file descriptor associated with a new socket created by manager 122. System kernel 120 establishes the connection using the specified file descriptor.

In some embodiments, if the modified connection system call 314 specified an internal destination, such as a service mesh, then system kernel 120 establishes a connection 316 to the internal destination. If the modified connection system call 314 specified a different external destination, then system kernel 120 establishes a connection (not shown) to the different external destination. In some embodiments, the service mesh establishes a connection (not shown) to the original destination specified in connection system call 306. For example, the manager 122 could send the original destination to the service mesh, and the service mesh establishes a connection to the original destination. As another example, if the manager 122 established a connection for the client using a new socket, the manager 122 could establish a connection to the original destination using the original socket created by the socket request 302 from the client, e.g., using file descriptor 304, and provide the original socket to the service mesh.

In some embodiments, if the manager 122 established the connection using a new socket, the manager 122 performs one or more operations 320 to replace the client socket 302 with the new socket. In some embodiments, manager 122 calls addfd( ) with parameters indicating a first file descriptor for the new socket and, optionally, a second file descriptor for the client socket. addfd( ) is a function for adding and/or replacing file descriptors. In some embodiments, addfd( ) is an input/output control (ioctl) call that manager 122 can call via the seccomp BPF program. addfd( ) receives, as parameters, at least a first file descriptor corresponding to the replacement file and, optionally, a second file descriptor corresponding to the file to be replaced in the destination process, i.e., the client application. If addfd( ) is called with the first file descriptor and the second file descriptor, when the addfd( ) call is executed, the file corresponding to the second file descriptor (i.e., the client socket) is replaced by the file corresponding to the first file descriptor (i.e., the new socket). Additionally, the file corresponding to the client socket can be closed after the replacement is completed. If addfd( ) is called with only the first file descriptor, the file corresponding to the first file descriptor (i.e., the new socket) is added to the destination process (i.e., the client application). Manager 122 sends the addfd( ) call to the system kernel 120 and system kernel 120 performs the above operations to replace the first file descriptor with the second file descriptor.

After manager 122, receives notification 318 indicating that the connection was successfully established, manager 122 sends a reply 322 to system kernel 120. The reply 322 is a response to the notification 310 from system kernel 120. In some embodiments, the reply 322 indicates that the manager 122 has successfully set up a connection on behalf of the client 118.

The system kernel 120 sends a notification 324 to the client 118, notifying client 118 that a connection was successfully established in response to the connection system call 306. In some embodiments, the modifications to the socket and/or to the target destination are not transparent to the client 118. In other words, the client 118 typically will not be aware that the socket has been modified. The client 118 treats the connection as if it were the connection the client had originally requested, i.e., sends and receives data using the socket at socket file descriptor 304. The client 118 is not aware or affected by the changes to the underlying socket at socket file descriptor 304.

Figure 4:
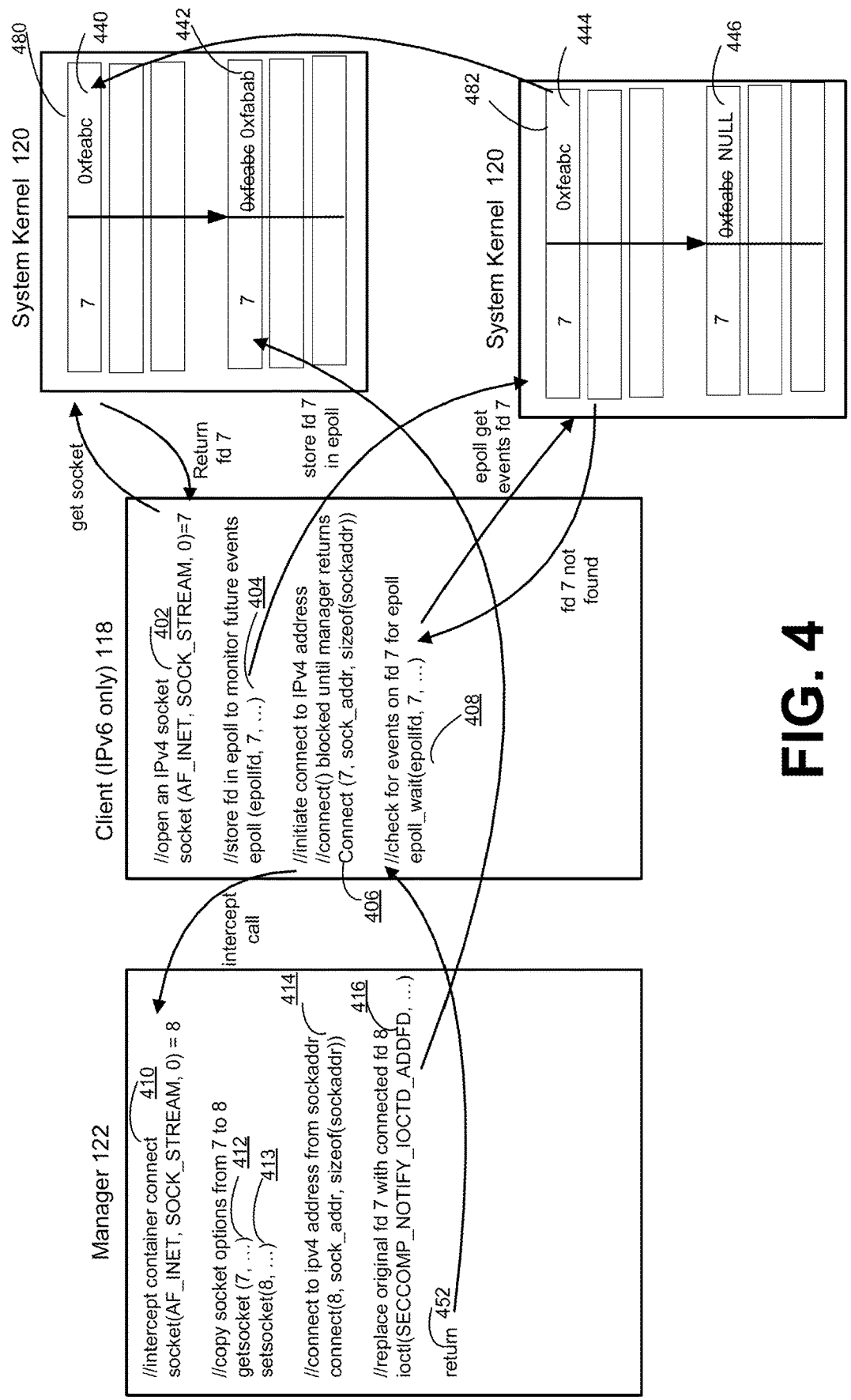
FIG. 4 sets forth a software code level illustration for intercepting and modifying a connection request with a new socket as discussed in connection with FIG. 3, according to various embodiments of the present invention.

FIG. 4 sets forth a software code level illustration for intercepting and modifying a connection request with a new socket as discussed in connection with FIG. 3, according to various embodiments of the present invention. Client 118 executes in a namespace that is assigned an IPv6 address. Client 118 can only connect to and receive connections from destinations with an IPv6 address, and cannot connect to or receive connections from destinations with an IPv4 address. Client 118 may execute function 402 to open a socket where the address of the target destination is an IPv4 address. The function 402 comprises sending a socket(AF_INET, SOCK_STREAM) call to system kernel 120, where AF_INET indicates that the communication domain for the socket is IPv4 internet protocols and SOCK_STREAM indicates that the socket is a streaming, connection-oriented socket. Client 118 receives a file descriptor (e.g., file descriptor 7) corresponding to the socket connection from system kernel 120. As noted previously, the file descriptor is a unique identifier that is used to identify the socket when specifying input parameters for a system call. System kernel 120 provides the socket file descriptor (e.g., file descriptor 7) to client 118 and also internally stores a reference 440 to a file associated with the file descriptor 7 in a file descriptor table 480.

In some embodiments, the client 118 can execute an optional epoll function call 404. The epoll function monitors a file descriptor to determine if an I/O is possible on the file descriptor. The epoll function creates a notification any time new data is available associated with a given socket, which can then be read from the socket. Accordingly, the epoll( ) call 404 creates an epoll instance associated with file descriptor 7, which was returned by the system kernel 120. The epoll instance stores the socket within an epoll table 482. More particularly, the epoll( ) call 404 stores a reference 444 to the file associated with the file descriptor 7 in an epoll table 482 within the system kernel 120. Note, that the reference 444 points to reference 440 in the file descriptor table 480.

The client 118 uses the socket file descriptor returned by the system kernel 120 when generating a request to establish a connection to a target destination using call 406. Client 118, for example, generates and sends a connection system call 406. As noted above, the connection system call 406 can include parameters associated with the requested connection, such as a socket for the connection and a target destination. The socket for the connection is identified using the socket file descriptor (e.g., file descriptor 7). For example, client 118 sends a connection system call 406 (using function connect(fd, addr, . . . )) to system kernel 120, where fd represents the socket file descriptor 7 and addr represents an address of the target destination. Note that the container attempts to create an IPv4 socket in its IPv6 network namespace with connection system call 406 and attempts to connect to the IPv4 destination.

System kernel 120 receives the connection system call 406 and performs one or more operations to inspect the connection system call and determine whether to handle the connection system call normally or to intercept the connection system call. As noted previously in connection with FIG. 3, the system kernel 120 determines that the connection system call 406 should be intercepted because the target destination in the connection system call 406 is an IPv4 address and sends a notification to the manager 122. The manager 122 is configured to intercept and/or modify the intercepted system call.

The manager 122 performs one or more operations (e.g., operations 312 as discussed in connection with FIG. 3) to generate modified system call parameters. In some embodiments, generating the one or more modified system call parameters includes sending a request (e.g., a socket( ) call 410) to create a new socket to system kernel 120 and receiving, from system kernel 120, a file descriptor for a new socket. A new socket with socket file descriptor 8 is created in response to the call 410. As noted previously in connection with FIG. 3, the new socket can be created in an IPv4 namespace. For example, manager 122 can execute in or switch execution to an IPv4 transition namespace and send a request to create a new socket to system kernel 120 while in the IPv4 transition namespace. The IPv4 transition namespace can be used for egress connectivity (e.g., to the target destination).

Thereafter, the manager 122 obtains socket options associated with the client socket and applies the socket options to the new socket by invoking functions getsocket( ) 412 and setsocket( ) 413. Accordingly, the socket options are copied over from the socket associated with socket file descriptor 7 to the new socket created by the manager with socket file descriptor 8.

The manager 122 then invokes a connection system call 414 to the system kernel 120 using the new socket associated with socket file descriptor 8 in order to connect to the IPv4 address. The socket( ) call is made using the newly created socket associated with file descriptor 8 as shown in FIG. 4. Running in the IPv4 transition namespace, the manager 122 uses the destination address from the original connect system call (the connect call 406 intercepted by the manager 122) and connects to the original destination address using the new socket created by call 410.

Further, the manager 122 invokes an ioctl( ) call 416 to install the new connected socket to replace and close the original socket associated with file descriptor 7 that was opened by the container. In some embodiments, manager 122 uses the ioctl( ) 416 to invoke addfd( ) which is a function for adding and/or replacing file descriptors as detailed above. The manager 122 can also execute a return 452 and request the kernel not to continue with the connect system call from client 118 since a connection has already been established using the newly created socket. The ioctl( ) call 416, which invokes addfd( ) also results in updating the reference in a file descriptor table 480 associated with the system kernel 120. For example, the reference 440, which previously pointed file descriptor 7 to a file associated with memory address 0xfeabc, is updated to a new reference 442, where the new reference 442 associates file descriptor 7 with a different file (with memory address 0xfabab) associated with the new socket created by the manager 122.

One of the challenges that arises with creating a new socket to replace the older socket is that after return 452 is executed and the container proceeds to process events on the previously stored file descriptor, an invocation of certain functions (e.g., epoll( ), poll( ), dup( )) that store references to the original file descriptors within data structures that are separate from the file descriptor table 480 can result in an error. An error may occur, for example, because the references to the file descriptors within the data structures associated with the functions (e.g., epoll( ), poll( ), dup( )) do not get updated when the new socket replaces the original socket responsive to the ioctl( ) call 416. This is problematic because it prevents the container from continuing to process events associated with the file descriptor.

For example, referring back to FIG. 4, following return 452, client 118 can execute an epoll_wait( ) call 408. An epoll_wait( ) call waits for events on the epoll instance referred to by the file descriptor received as a parameter. Accordingly, the epoll_wait( ) call 408 in FIG. 4 waits for events on the epoll instance referred to by the file descriptor 7. The reference 444 stored in epoll table 482 (that is referred to by the epoll_wait( ) call 408) is outdated because the ioctl( ) call 416 (which invokes addfd( ) has installed a new connected socket to replace and close the original socket associated with file descriptor 7 that was originally opened by the container (using call 402). However, the epoll table 482 was never updated to reflect a new reference (or pointer) to an updated file associated with file descriptor 7. As a result, file descriptor 7 is associated with a NULL pointer 446 and any invocation of an epoll( ) call will result in an error because the corresponding file for file descriptor 7 no longer exists.

Another challenge that results from creating a new socket to replace the older socket is that it requires maintaining an exhaustive list of socket options that need to be checked on the old socket and copied over to the new socket created by the manager 122 after interception (e.g., using calls 412 and 413 as shown in FIG. 4).

Modifying A Socket Network Namespace For Connecting To A Target Destination

To address the challenges associated with creating a new socket to replace the original socket for connecting to a target destination address that is an IPv4 address, in some embodiments, instead of creating a new socket, the network namespace of the original socket is swapped with the IPv4 transition namespace. Replacing the IPv6 namespace of a socket with the IPv4 transition namespace allows the socket to connect to an IPv4 destination without needing to create an additional replacement socket. Avoiding the creation of the additional socket reduces overhead and prevents conflicts pertaining to instances where a container has handed off a socket reference to be stored in multiple systems or locations (e.g., an epoll table). Also, replacing the network namespace of a socket instead of creating a new socket prevents needing to maintain an exhaustive list of socket options to potentially copy over to a new socket and also leads to a simpler solution.

Figure 5:
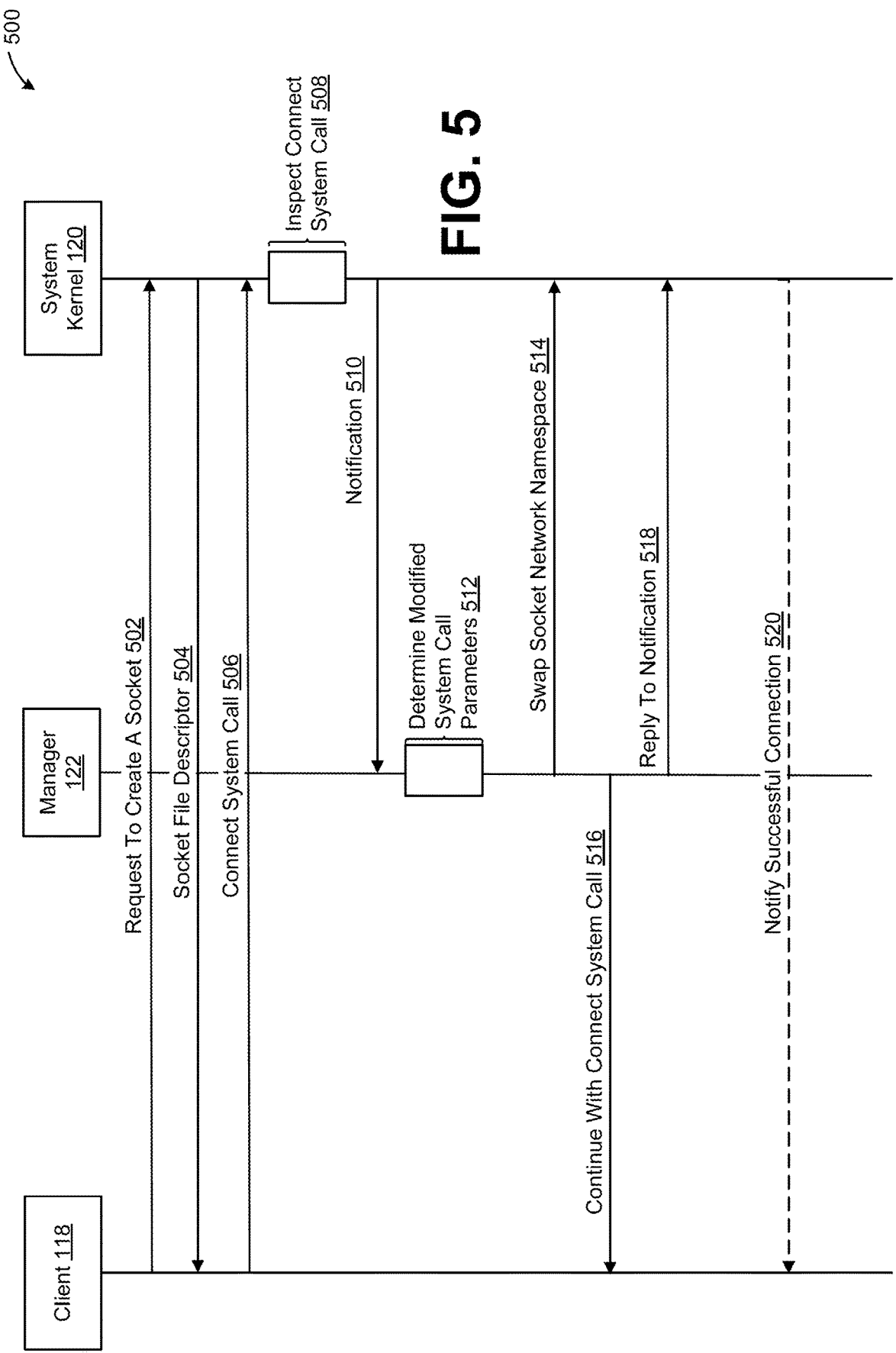
FIG. 5 illustrates an example call flow diagram showing interactions between various components of a computing device, according to various embodiments of the present invention.

FIG. 5 illustrates an example call flow diagram showing interactions between various components of computing device 100, according to various embodiments of the present invention. One or more components of the computing device 100 may perform various operations for intercepting and modifying system calls made by a client application, such as connect and socket system calls. Although the interactions between the various components are shown in an order, persons skilled in the art will understand that the interactions may be performed in a different order, interactions may be repeated or skipped, and/or may be performed by components other than those illustrated in FIG. 3.

Client 118 sends a request to create a socket 502 to system kernel 120. The socket request 502 can include one or more parameters associated with the socket, such as a socket type, a communication domain, and a communication protocol. For example, client 118 sends a socket( ) call to system kernel 120.

In response to receiving the socket request 502, system kernel 120 creates a socket for communications by client 118. The socket is associated with a file descriptor 504. As mentioned previously, a file descriptor is a unique identifier that is used to identify the socket when specifying input parameters for a system call. System kernel 120 provides the socket file descriptor 504 to client 118.

Client 118 uses the socket file descriptor 504 when generating a request to establish a connection to a target destination. Client 118 generates and sends a connection system call 506. The connection system call 506 can include parameters associated with the requested connection, such as a socket for the connection and a target destination. The socket for the connection is identified using the socket file descriptor 504. For example, client 118 sends a connect(fd, addr) call to system kernel 120, where fd represents the socket file descriptor 504 and addr represents an address of the target destination. The connection system call 506, for example, may attempt to create a IPv4 socket in an IPv6 network namespace associated with the container and attempt to connect to a target destination that is an IPv4 address.

System kernel 120 receives the connection system call 506 and performs one or more operations 508 to inspect the connection system call and determine whether to handle the connection system call normally or to intercept the connection system call. In some embodiments, the inspection is performed by a software program that is configured to filter the system calls that should be intercepted. In some embodiments, determining whether to intercept the connection system call is based on one or more of the type of system call, the client that generated the system call, and/or a target destination specified in the system call.

System kernel 120 determines that the connection system call 506 should be intercepted, and sends a notification 510 to manager 122. For example, the system kernel 120 may intercept any connection calls if the target destination is an IPv4 address but the client 118 operates in an IPv6 network namespace. In other words, a call may be intercepted if a container attempts to create an IPv4 socket in its IPv6 network namespace and attempts to connect to the IPv4 destination. In some embodiments, the notification indicates one or more of the clients that generated the system call (e.g., client 118), the type of system call (e.g., connect( ) call), and/or the one or more parameters included in the system call (e.g., the file descriptor and the target destination). Manager 122 is configured to intercept and/or modify intercepted system calls. In response to receiving the notification, manager 122 performs one or more operations 512 to generate modified system call parameters based on the system call 506.

In some embodiments, client 118 executes in a namespace that is assigned an IPv6 address. In other words, the namespace is an IPv6 network namespace. As noted above, in some embodiments, the one or more intermediary services 124 include an IPv4 transition namespace that is assigned an IPv4 address. Applications executing in the IPv4 transition namespace can connect to and receive connections from destinations with an IPv4 address. The IPv4 transition namespace can be used to establish egress connections from applications executing in an IPv6 namespace to destinations with an IPv4 address.

In some embodiments, generating the one or more modified system call parameters includes obtaining the socket file descriptor 504 from the client 118 and receiving the socket file descriptor 504 for the socket established by the prior socket request 502 from the client. In some embodiments, to obtain socket file descriptor 504, manager 122 calls pidfd_getfd(pidfd, targetfd), where targetfd represents a file descriptor associated with a target file descriptor (i.e., socket file descriptor 504), and pidfd represents a file descriptor associated with a process (i.e., client 118) that opened the target file descriptor. As explained above, pidfd_getfd( ) is a system call for extracting a copy of a target file descriptor from another process. When the pidfd_getfd( ) call is executed, the local file descriptor identifier associated with the target file descriptor is returned. The local file descriptor identifier can be used to issue further system calls that operate on the target file descriptor, e.g., the client socket. For example, the native namespace (e.g., an IPv6 namespace) of a client socket can be replaced with a different namespace (e.g., the IPv4 transition namespace).

In some embodiments, if the address of the target destination is an IPv4 address, then manager 122 can switch the network namespace of the socket 502 from the IPv6 network namespace to the IPv4 transition namespace (e.g., the IPv4 transition namespace 250 as shown in FIG. 2B). For example, manager 122 can invoke a new function socket_switch_network_namespace(fd,transition_namespace) that sends a call 514 to system kernel 120, where fd represent the socket file descriptor 504 and transition_namespace represents the transitionary namespace that the IPv6 namespace of the socket is replaced with (e.g., the IPv4 transition namespace). Note that unlike the embodiment discussed in connection with FIG. 3, the manager 122 does not need to establish a separate connection (using a separate socket) on behalf of the client 118. Instead, when the manager 122 changes the namespace associated with the socket to reflect the IPv4 transition namespace, the original socket can continue to be used to establish a connection to the IPv4 destination. Previously, the socket was created with an IPv6-only network namespace, blocking any visibility of an IPv4 destination. However, after swapping the network namespace, the original socket can detect the IPv4 destination.

When the socket is first created, the socket points to the network namespace associated with client 118 (e.g., the IPv6 namespace). When the manager 122 invokes the call 514, the manager 122 swaps the pointer to the network namespace to the IPv4 transition namespace. Once the socket's network namespace has been switched over to the IPv4 transition namespace, the client 118 is able to use the socket to connect to the IPv4 target destination.

In some embodiments, after changing the namespace of the socket associated with file descriptor 504, the manager 122 sends a notification 516 back to the client 118 to continue with the connect system call 506 previously attempted by the client. In some embodiments, the manager 122 may also transmit a reply 518 sent in response to notification 510 from system kernel 120. In some embodiments, the reply 518 indicates that the manager 122 has successfully swapped the network namespace of the socket, where the socket's new network namespace can be directly accessed from the socket.

The system kernel 120 sends a notification 520 to the client 118, notifying client 118 to continue to successfully make the connection that was initiated in response to the connection system call 506. It should be noted the modifications to the socket are opaque or not transparent to the client 118. The client 118 treats the connection as if it were the connection the client had originally requested, e.g., using the socket with the IPv6 namespace at socket file descriptor 504. In other words, the client 118 is not aware or affected by the underlying changes to the network namespace of the underlying socket at socket file descriptor 504.

Figure 6:
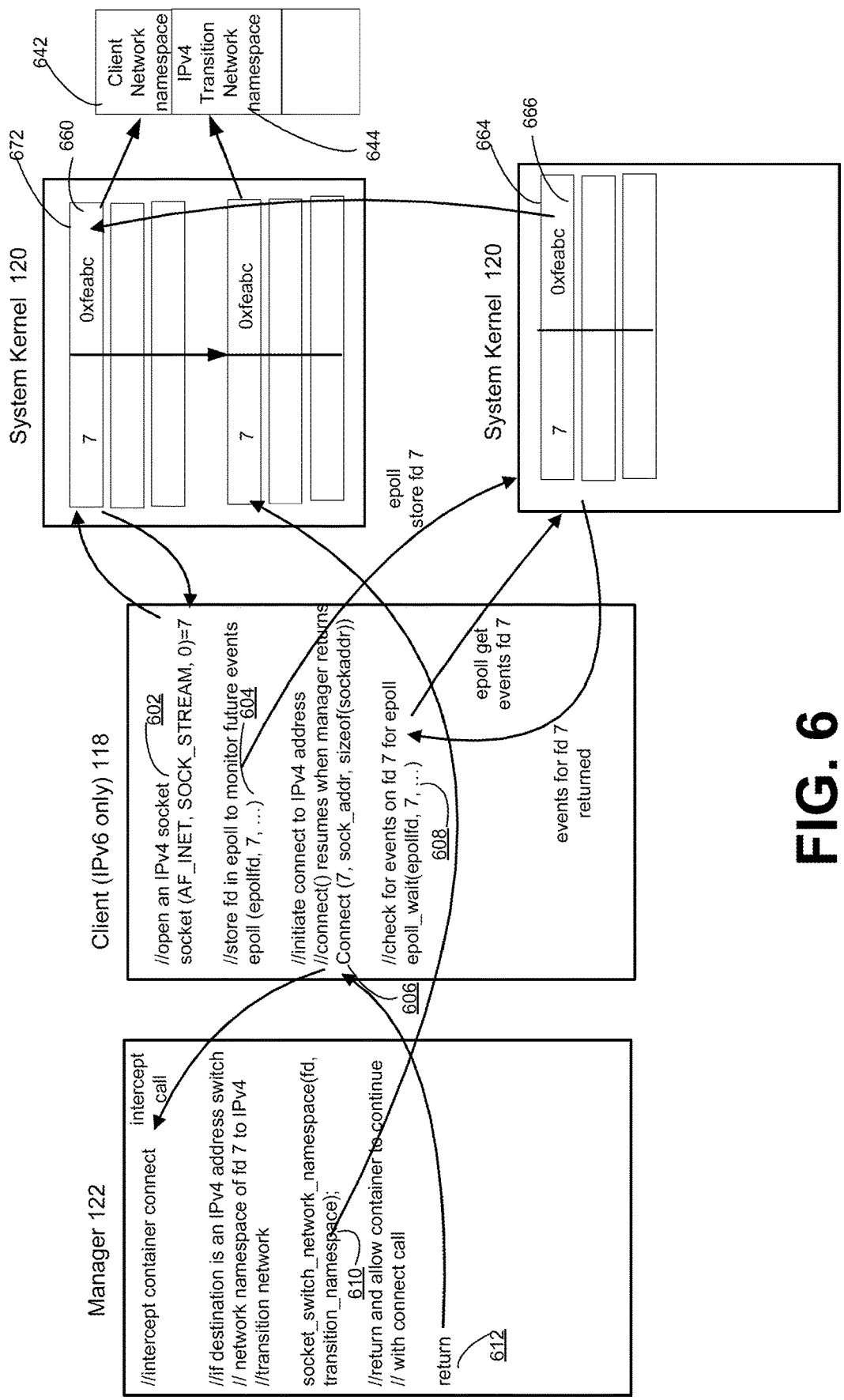
FIG. 6 sets forth a software code level illustration for intercepting and modifying a connection request by replacing a network namespace in a socket as discussed in connection with FIG. 5, according to various embodiments of the present invention.

FIG. 6 sets forth a software code level illustration for intercepting and modifying a connection request by replacing a network namespace in a socket as discussed in connection with FIG. 5, according to various embodiments of the present invention. Client 118 executes in a namespace that is assigned an IPv6 address. Client 118 can only connect to and receive connections from destinations with an IPv6 address, and cannot connect to or receive connections from destinations with an IPv4 address. Client 118 may execute function 602 to open a socket where the address of the target destination is an IPv4 address. The function 602 comprises sending a socket(AF_INET, SOCK_STREAM) call to system kernel 120, where AF_INET indicates that the communication domain for the socket is IPv4 internet protocols and SOCK_STREAM indicates that the socket is a streaming, connection-oriented socket. Client 118 receives a file descriptor (e.g., file descriptor 7) corresponding to the socket connection from system kernel 120. System kernel 120 provides the socket file descriptor (e.g., file descriptor 7) to client 118 and also internally stores a memory reference 660 (e.g., a memory address) to a file associated with the file descriptor 7 in a file descriptor table 672. Note that the client network namespace 642 pointed to by the socket file associated with reference 660 can be an IPv6 namespace.

In some embodiments, the client 118 can execute an optional epoll function call 604. As discussed previously, the epoll function monitors a file descriptor to determine if an I/O is possible on the file descriptor. The epoll( ) call 604 creates an epoll instance associated with file descriptor 7, which was returned by the system kernel 120. The epoll instance stores the socket within an epoll table 664. More particularly, the epoll( ) call 604 stores a reference 666 to the file associated with the file descriptor 7 in an epoll table 664 within the system kernel 120. Note, that the reference 664 points to reference 660 in the file descriptor table 672.

The client 118 uses the socket file descriptor returned by the system kernel 120 when generating a request to establish a connection to a target destination using call 606. Client 118, for example, generates and sends a connection system call 606. As noted above, the connection system call 606 can include parameters associated with the requested connection, such as a socket for the connection and a target destination. The socket for the connection is identified using the socket file descriptor (e.g., file descriptor 7). Note that the container creates an IPv4 socket in its IPv6 network namespace and attempts to connect to the IPv4 destination.

System kernel 120 receives the connection system call 606 and performs one or more operations to inspect the connection system call and determine whether to handle the connection system call normally or to intercept the connection system call. As noted previously in connection with FIG. 5, the system kernel 120 determines that the connection system call 606 should be intercepted because the target destination in the connection system call 606 is an IPv4 address and sends a notification to the manager 122. The manager 122 is configured to intercept and/or modify the intercepted system call.

The manager 122 performs one or more operations (e.g., operations 512 as discussed in connection with FIG. 5) to generate modified system call parameters. In some embodiments, as discussed above, the manager 122 may execute a call 610 to function socket_switch_network_namespace(fd, transition_namespace) that modifies the socket by changing the network namespace of the socket to the IPv4 transition namespace. Note that the fd parameter passed to the function call 610 is associated with file descriptor 7 and the transition_namespace parameter is associated with an IPv4 transition namespace in one or more intermediary services 124 as discussed in connection with FIG. 1. In some embodiments, the manager 122 modifies the network namespace of the socket by interacting with kernel 120 and the socket file referenced by the file descriptor table 672. For example, the manager changes the file pointed to by the memory address 0xfeabc stored at reference 660, which is associated with file descriptor 7. Modifying the file associated with file descriptor 7 to swap the network namespace to an IPv4 transition namespace does not change the file reference 660 or the memory address 0xfeabc included therein. The only modification made by the manager 122 is that the file now includes a pointer to an IPv transition network namespace 644 (instead of the IPv6-only client network namespace 642). Accordingly, a benefit of this technique is that no conflicts are created between the file descriptor table 672 and other data structures (e.g., an epoll table) that store references to the socket.

As noted previously in connection with FIG. 4, one of the challenges that arises with creating a reference to new socket to replace the older socket reference is that after return 452 (from FIG. 4) is executed and the container proceeds to process events on the previously stored file descriptor, an invocation of certain functions (e.g., epoll( ), poll( ), dup( )) that store references to the original file descriptors within data structures that are separate from the file descriptor table 480 can result in an error. The embodiment illustrated in FIG. 6 avoids that problem because the reference associated with file descriptor 7 (including the file pointed to by the reference) does not need to be modified as a result of a new socket. Instead, the socket remains the same and, accordingly, the reference 666 in epoll table 664 does not need to be updated. The file at memory address 0xfeabc, as referenced in both the file descriptor table 672 and the epoll table 664, is the same file even after the manager 122 has replaced the network namespace within the file. In other words, the file at memory address 0xfeabc is not replaced by a different file.

Referring back to FIG. 6, following return 612, client 118 can continue to connect to the IPv4 destination using the same socket by executing the connection system call 606. Because the network namespace of the socket associated with the file descriptor 7 has been swapped to reflect the IPv4 transition namespace, this connection is not transparent to the client 118. Thereafter, when an epoll_wait( ) call 608 executes, any events associated with file descriptor 7 are seamlessly returned from the epoll table 664 because the reference 666 remains consistent with the file descriptor table 672.

Figure 7:
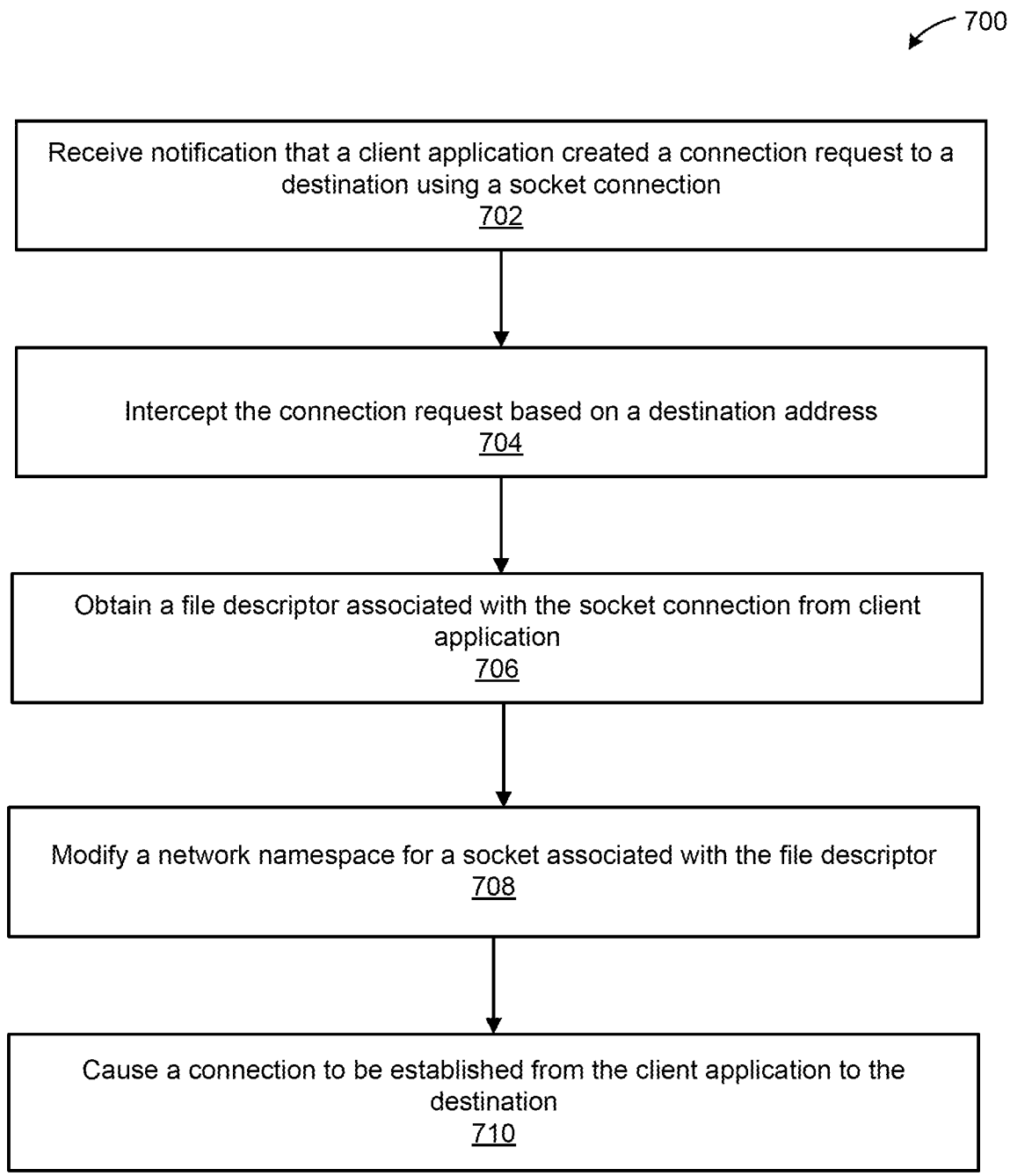
FIG. 7 is a flow diagram of method steps for intercepting and modifying a connection request, according to various embodiments of the present invention.

FIG. 7 is a flow diagram of method steps 700 for intercepting and modifying a connection request, according to various embodiments of the present invention. Although the method steps are described with reference to the system of FIG. 1 and call flows and code-level representations of FIGS. 5 and 6, respectively, persons skilled in the art will understand that any system configured to implement the method steps, in any order, falls within the scope of the present invention.

As shown in FIG. 7, method 700 begins at step 702, where manager 122 receives a notification that a client application created a connection request to a destination using a socket connection. For example, manager 122 receives a notification 510 from system kernel 120 that client 118 called a system call 506. In some embodiments, notification 510 includes information identifying one or more of the client 118, the system call 506, or one or more parameters of system call 506. As an example, client 118 calls connect(5, 1.2.3.4), where '5' is the file descriptor for the socket connection and '1.2.3.4' is address of the first destination. Notification 510 could include that the system call was a connect( ) call, that '5' is the identifier used by client 118 for the file descriptor, and/or that the target destination is the IP address '1.2.3.4.'

At step 704, the manager 122 intercepts the connection request based on the destination address. The direction to intercept the connection request may have been received by the manager as part of the notification 510 from the kernel 120. As noted previously, system kernel 120 can determine that the connection system call 506 should be intercepted, and sends a notification 510 to manager 122. For example, the call may be intercepted because the call contains an IPv4 destination address in a socket with an IPv6 address namespace. In some embodiments, the notification indicates one or more of the client that generated the system call (e.g., client 118), the type of system call (e.g., connect( ) call), and/or the one or more parameters included in the system call (e.g., the file descriptor and the target destination). Manager 122 is configured to intercept and/or modify intercepted system calls.

At step 706, manager 122 obtains a file descriptor associated with the socket connection from the client application. In some embodiments, manager 122 obtains the file descriptor by sending a pidfd_getfd( ) call, which returns the file descriptor. Referring to the above example, manager 122 sends pidfd_getfd(clientfd, 5), where clientfd is the file descriptor for the client 118 process, and '5' is the file descriptor identifier used by client 118 for the socket connection. Manager 122 receives the file descriptor for the socket connection.

At step 708, the manager 122 modifies the network namespace for the socket associated with the retrieved file descriptor from an IPv6-only namespace to a IPv4 transition namespace. As discussed earlier, the IPv4 transition namespace may be accessed from one or more intermediary services 124 as discussed in connection with FIG. 1.

At step 710, the manager 122 causes a connection to be established from the client 118 to the destination. For example, the manager 122 can notify a client application to proceed with the connection request from step 702.

One benefit of modifying the socket connection to use a namespace with IPv4 connectivity is that client 118 is able to efficiently communicate with a destination with an IPv4 address. Unlike prior techniques that modify communications on a packet-by-packet basis, client 118 can communicate with the IPv4 destination without an intermediary having to monitor every packet to and from client 118 to determine whether the packet destination needs to be modified. Accordingly, using the disclosed techniques, client 118 is able to transmit data using less processing power and in a faster amount of time compared to conventional techniques. Furthermore, once the connection is established, manager 122 is not involved in communications between client 118 and the destination. Even if manager 122 were to fail, established connections would not be affected by the failure. Therefore, using the disclosed techniques, client 118 is also able to transmit data more reliably compared to using a proxy service or other routing techniques.

Network Infrastructure

Figure 8:
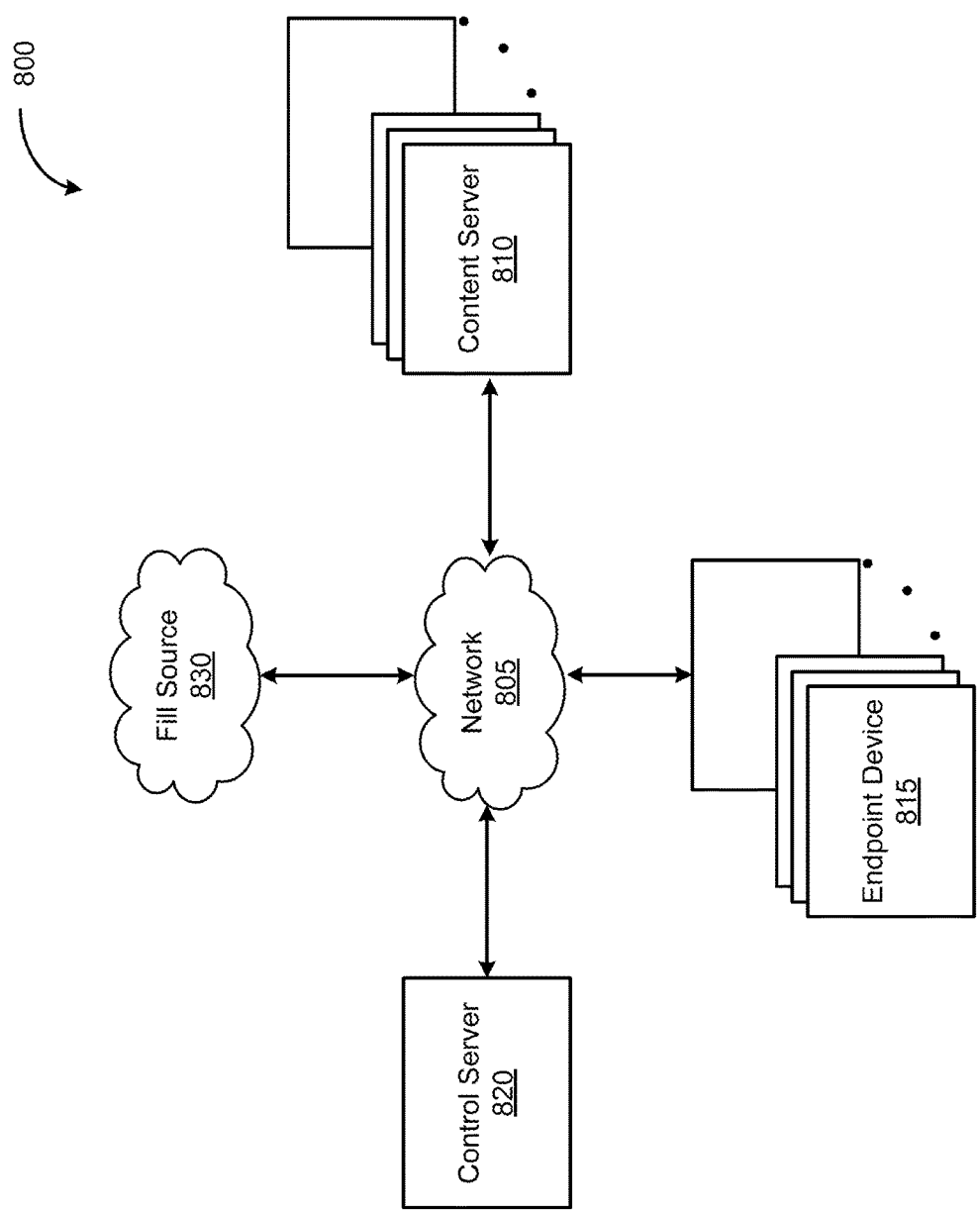
FIG. 8 illustrates a network infrastructure, according to various embodiments.

FIG. 8 illustrates a network infrastructure configured to implement one or more aspects of the various embodiments. As shown, network infrastructure 800 includes one or more content servers 810, a control server 820, and one or more endpoint devices 815, which are connected to one another and/or one or more cloud services 830 via a communications network 805. Network infrastructure 800 is generally used to distribute content to content servers 810 and endpoint devices 815.

Each endpoint device 815 communicates with one or more content servers 810 (also referred to as "caches" or "nodes") via network 805 to download content, such as textual data, graphical data, audio data, video data, and other types of data. The downloadable content, also referred to herein as a "file," is then presented to a user of one or more endpoint devices 815. In various embodiments, endpoint devices 815 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 805 includes any technically feasible wired, optical, wireless, or hybrid network that transmits data between or among content servers 810, control server 820, endpoint device 815, cloud services 830, and/or other components. For example, network 805 could include a wide area network (WAN), local area network (LAN), personal area network (PAN), WiFi network, cellular network, Ethernet network, Bluetooth network, universal serial bus (USB) network, satellite network, and/or the Internet.

Each content server 810 may include one or more applications configured to communicate with control server 820 to determine the location and availability of various files that are tracked and managed by control server 820. Each content server 810 may further communicate with cloud services 830 and one or more other content servers 810 to "fill" each content server 810 with copies of various files. In addition, content servers 810 may respond to requests for files received from endpoint devices 815. The files may then be distributed from content server 810 or via a broader content distribution network. In some embodiments, content servers 810 may require users to authenticate (e.g., using a username and password) before accessing files stored on content servers 810. Although only a single control server 820 is shown in FIG. 8, in various embodiments multiple control servers 820 may be implemented to track and manage files.

In various embodiments, cloud services 830 may include an online storage service (e.g., Amazon® Simple Storage Service, Google® Cloud Storage, etc.) in which a catalog of files, including thousands or millions of files, is stored and accessed in order to fill content servers 810. Cloud services 830 also may provide compute or other processing services. Although only a single instance of cloud services 830 is shown in FIG. 8, in various embodiments multiple cloud services 830 and/or cloud service instances may be implemented.

Figure 9:
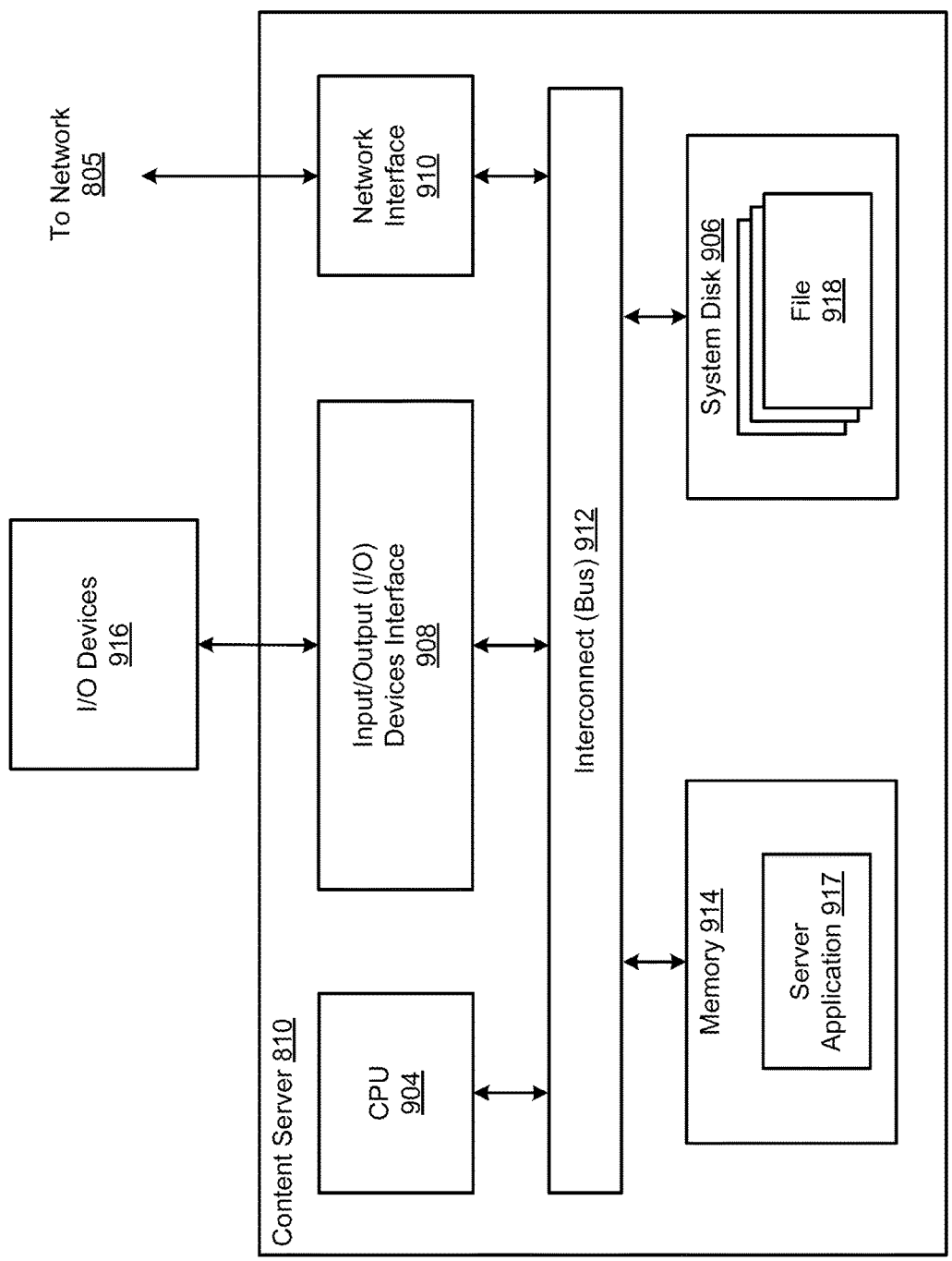
FIG. 9 is a more detailed illustration of the content server of FIG. 1, according to various embodiments.

FIG. 9 is a block diagram of content server 810 that may be implemented in conjunction with the network infrastructure of FIG. 8, according to various embodiments. As shown, content server 810 includes, without limitation, a central processing unit (CPU) 904, a system disk 906, an input/output (I/O) devices interface 908, a network interface 910, an interconnect 912, and a system memory 914.

CPU 904 is configured to retrieve and execute programming instructions, such as a server application 917, stored in system memory 914. Similarly, CPU 904 is configured to store application data (e.g., software libraries) and retrieve application data from system memory 914. Interconnect 912 is configured to facilitate transmission of data, such as programming instructions and application data, between CPU 904, system disk 906, I/O devices interface 908, network interface 910, and system memory 914. I/O devices interface 908 is configured to receive input data from I/O devices 916 and transmit the input data to CPU 204 via interconnect 912. For example, I/O devices 916 may include one or more buttons, a keyboard, a mouse, and/or other input devices. I/O devices interface 908 is further configured to receive output data from CPU 904 via interconnect 912 and transmit the output data to I/O devices 916.

System disk 906 may include one or more hard disk drives, solid state storage devices, or similar storage devices. System disk 906 is configured to store non-volatile data such as files 918 (e.g., audio files, video files, subtitle files, application files, software libraries, etc.). Files 918 can then be retrieved by one or more endpoint devices 815 via network 805. In some embodiments, network interface 910 is configured to operate in compliance with the Ethernet standard.

System memory 914 includes server application 917, which is configured to service requests received from endpoint device 815 and other content servers 810 for one or more files 918. When server application 917 receives a request for a given file 918, server application 917 retrieves the requested file 918 from system disk 906 and transmits file 918 to an endpoint device 815 or a content server 810 via network 805. Files 918 include digital content items such as video files, audio files, and/or still images. In addition, files 918 may include metadata associated with such content items, user/subscriber data, etc. Files 918 that include visual content item metadata and/or user/subscriber data may be employed to facilitate the overall functionality of network infrastructure 800. In alternative embodiments, some or all of files 918 may instead be stored in a control server 820, or in any other technically feasible location within network infrastructure 800.

Figure 10:
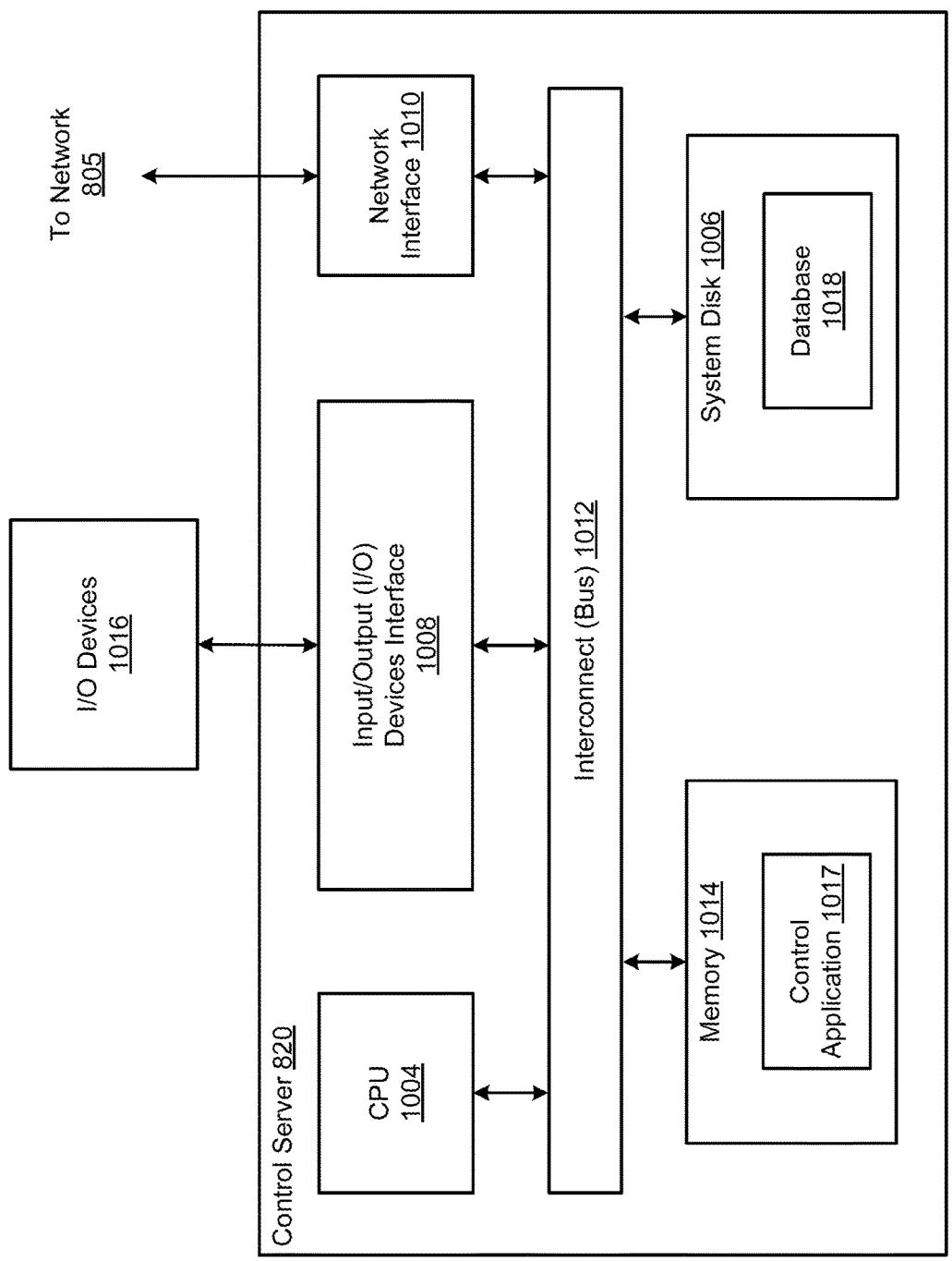
FIG. 10 is a more detailed illustration of the control server of FIG. 1, according to various embodiments.

FIG. 10 is a block diagram of control server 820 that may be implemented in conjunction with the network infrastructure 800 of FIG. 8, according to various embodiments. As shown, control server 820 includes, without limitation, a central processing unit (CPU) 1004, a system disk 1006, an input/output (I/O) devices interface 1008, a network interface 1010, an interconnect 1012, and a system memory 1014.

CPU 1004 is configured to retrieve and execute programming instructions, such as control application 1017, stored in system memory 1014. Similarly, CPU 1004 is configured to store application data (e.g., software libraries) and retrieve application data from system memory 1014 and a database 1018 stored in system disk 1006. Interconnect 1012 is configured to facilitate transmission of data between CPU 1004, system disk 1006, I/O devices interface 1008, network interface 1010, and system memory 1014. I/O devices interface 1008 is configured to transmit input data and output data between I/O devices 1016 and CPU 1004 via interconnect 1012. System disk 1006 may include one or more hard disk drives, solid state storage devices, and the like. System disk 1006 is configured to store a database 1018 of information associated with content servers 810, cloud services 1100, and files 918.

System memory 1014 includes a control application 1017 configured to access information stored in database 1018 and process the information to determine the manner in which specific files 918 will be replicated across content servers 810 included in the network infrastructure 800. Control application 1017 may further be configured to receive and analyze performance characteristics associated with one or more of content servers 810 and/or endpoint devices 815. As noted above, in some embodiments, metadata associated with such visual content items, and/or user/subscriber data may be stored in database 1018 rather than in files 918 stored in content servers 810.

Figure 11:
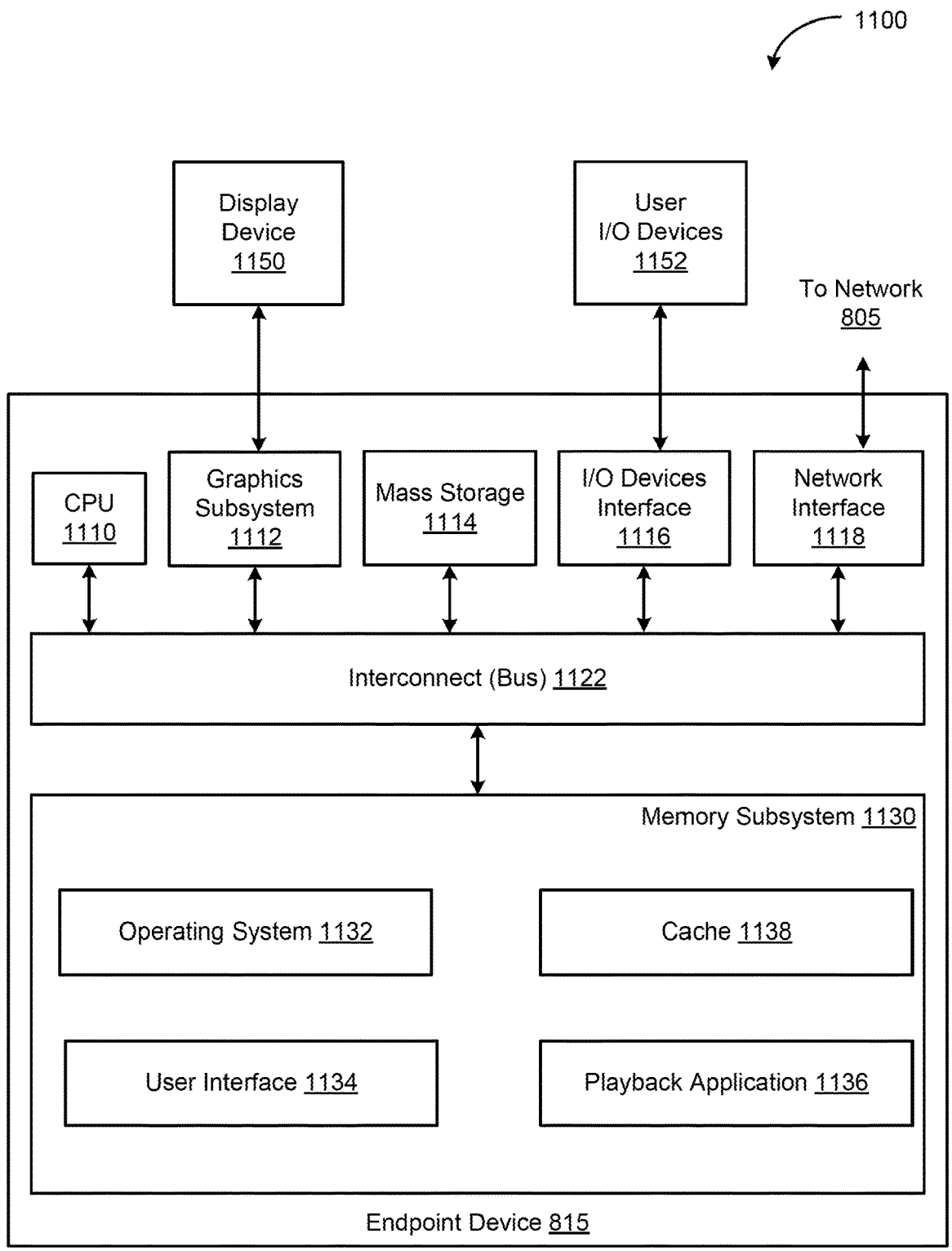
FIG. 11 is a more detailed illustration of the endpoint device of FIG. 1, according to various embodiments.

FIG. 11 is a block diagram of endpoint device 815 that may be implemented in conjunction with the network infrastructure of FIG. 8, according to various embodiments. As shown, endpoint device 815 may include, without limitation, a CPU 1110, a graphics subsystem 1112, an I/O devices interface 1114, a mass storage unit 1116, a network interface 1118, an interconnect 1122, and a memory subsystem 1130.

In some embodiments, CPU 1110 is configured to retrieve and execute programming instructions stored in memory subsystem 1130. Similarly, CPU 1110 is configured to store and retrieve application data (e.g., software libraries) residing in memory subsystem 1130. Interconnect 1122 is configured to facilitate transmission of data, such as programming instructions and application data, between CPU 1110, graphics subsystem 1112, I/O devices interface 1114, mass storage unit 1116, network interface 1118, and memory subsystem 1130.

In some embodiments, graphics subsystem 1112 is configured to generate frames of video data and transmit the frames of video data to display device 1150. In some embodiments, graphics subsystem 1112 may be integrated into an integrated circuit, along with CPU 1110. Display device 1150 may comprise any technically feasible means for generating an image for display. For example, display device 1150 may be fabricated using liquid crystal display (LCD) technology, cathode-ray technology, and light-emitting diode (LED) display technology. I/O devices interface 1114 is configured to receive input data from user I/O devices 1152 and transmit the input data to CPU 1110 via interconnect 1122. For example, user I/O devices 1152 may include one or more buttons, a keyboard, and/or a mouse or other pointing device. I/O devices interface 1114 also includes an audio output unit configured to generate an electrical audio output signal. User I/O devices 1152 includes a speaker configured to generate an acoustic output in response to the electrical audio output signal. In alternative embodiments, display device 1150 may include the speaker. Examples of suitable devices known in the art that can display video frames and generate an acoustic output include televisions, smartphones, smartwatches, electronic tablets, and the like.

A mass storage unit 1116, such as a hard disk drive or flash memory storage drive, is configured to store non-volatile data. Network interface 1118 is configured to transmit and receive packets of data via network 805. In some embodiments, network interface 1118 is configured to communicate using the well-known Ethernet standard. Network interface 1118 is coupled to CPU 1110 via interconnect 1122.

In some embodiments, memory subsystem 1130 includes programming instructions and application data that include an operating system 1132, a user interface 1134, a playback application 1136, and a platform player 1138. Operating system 1132 performs system management functions such as managing hardware devices including network interface 1118, mass storage unit 1116, I/O devices interface 1114, and graphics subsystem 1112. Operating system 1132 also provides process and memory management models for user interface 1134, playback application 1136, and/or platform player 1138. User interface 1134, such as a window and object metaphor, provides a mechanism for user interaction with endpoint device 815. Persons skilled in the art will recognize the various operating systems and user interfaces that are well-known in the art and suitable for incorporation into endpoint device 815.

In some embodiments, playback application 1136 is configured to request and receive content from content server 810 via network interface 1118. Further, playback application 1136 is configured to interpret the content and present the content via display device 1150 and/or user I/O devices 1152. In so doing, playback application 1136 may generate frames of video data based on the received content and then transmit those frames of video data to platform player 1138. In response, platform player 1138 causes display device 1150 to output the frames of video data for playback of the content on endpoint device 815. In one embodiment, platform player 1138 is included in operating system 1132.

In sum, a system kernel executing on a computing device monitors system calls generated by other applications executing on the computing device. The system kernel intercepts one or more system calls and sends the intercepted system calls to a manager. The manager modifies the system call and causes the modified system call to be executed instead of the intercepted system call. In some embodiments, the intercepted system call is a connection request from an application to a target destination. The manager modifies the connection request and causes a modified connection to be established based on the modified connection request, where the modification to the connection request is transparent to the application. For example, the manager can intercept a client connection request from a client operating in an IPv6-only address namespace and, based on a determination that the request contains an IPv4 destination, the manager can modify the socket associated with the connection request to replace the address namespace with an IPv4 transition namespace. Thereafter, the socket can be used to connect to an IPv4 destination in a way that is transparent to the client initiating the connection request.

At least one technological advantage of the disclosed techniques relative to the prior art is that, with the disclosed techniques, a connection from a client application to an external destination is modified more efficiently compared to prior art techniques. In particular, a connection system call made by a client application is modified by a manager application to support a connection to a destination not originally supported by a client. For example, for client applications that support an IPv6 network exclusively, the manager application can replace the network namespace of a socket (associated with the connection system call) to an IPv4 transition namespace that is assigned an IPv4 address. Thereafter, executing in the IPv4 transition namespace, a client application can connect to and receive connections from destinations with an IPv4 address. Accordingly, using the disclosed techniques, packets and/or messages from the client application do not have to be monitored and re-routed individually at the packet level, which results in less processing overhead and lower packet transmission latency relative to conventional techniques.

Furthermore, replacing the network namespace of the socket obtained by the client application preempts the need for the manager application to create separate additional sockets used to bridge the connection between the client application and the destination. Accordingly, using the disclosed techniques prevents the need to maintain an exhaustive list of socket options to copy over to additional sockets created by the manager application and also precludes any inconsistencies in the system resulting from creating multiple sockets to support a single connection. These technical advantages provide one or more technological advancements over prior art approaches.

1. In some embodiments, a computer-implemented method for modifying system calls from a client application, the method comprises intercepting a system call from a client application, wherein the system call comprises a request to connect to a target destination; obtaining a file descriptor for a socket associated with the request to connect from the client application; modifying a network namespace for the socket; and causing a connection to be established from the client application to the target destination.
2. The method of clause 1, wherein causing the connection to be established comprises notifying the client application to continue with the request to connect following the intercepting, wherein the request to connect uses the socket with the modified network namespace to establish the connection.
3. The method of clauses 1 or 2, wherein the target destination is an IPv4destination, and wherein the network namespace for the socket is modified to an IPv4transition network namespace, wherein the IPv4 transition network namespace can be used to establish egress connections from applications executing in an IPv6 namespace to destinations with an IPv4 address.
4. The method of clauses 1-3, wherein the client application operates exclusively in an IPv6 network namespace.
5. The method of clauses 1-4, wherein modifying the network namespace comprises accessing the socket associated with the file descriptor stored at a system kernel and replacing the network namespace associated with the socket with an IPv4transition network namespace in the file.
6. The method of clauses 1-5, wherein a reference to the file is accessible in a file descriptor table in the system kernel.
7. The method of clauses 1-6, wherein an epoll table in the system kernel stores a pointer to the reference to the file.
8. The method of clauses 1-7, wherein the reference to the file comprises a memory location of the file.
9. The method of clauses 1-8, further comprising prior to intercepting the system call, receiving a notification from a system kernel to intercept the system call based on a determination that an IPv4 destination is included in the request to connect from the client application, and wherein the client application is associated with an IPv6-only network namespace.
10. In some embodiments, one or more non-transitory computer-readable media storing instructions that, when executed by one or more processors, cause the one or more processors to perform the steps of intercepting a system call from a client application, wherein the system call comprises a request to connect to a target destination; obtaining a file descriptor for a socket associated with the request to connect from the client application; modifying a network namespace for the socket; and notifying the client application to continue with the request to connect, wherein the request to connect uses the socket with the modified network namespace to establish the connection.
11. The one or more non-transitory computer-readable media of clause 10, wherein the target destination is an IPv4 destination, and wherein the network namespace for the socket is modified to an IPv4 transition network namespace, wherein the IPv4 transition network namespace can be used to establish egress connections from applications executing in an IPv6 namespace to destinations with an IPv4 address.
12. The one or more non-transitory computer-readable media of clauses 10-11, wherein modifying the network namespace comprises accessing a file associated with the socket stored at a system kernel and replacing the network namespace associated with the socket in the file with an IPv4 transition network namespace.
13. The one or more non-transitory computer-readable media of clauses 10-12, wherein the steps further comprise prior to intercepting the system call, receiving a notification from a system kernel to intercept the system call based on a determination that an IPv4 destination is included in the request to connect from the client application, and wherein the client application is associated with an IPv6-only network namespace
14. In some embodiments, a system comprises one or more memories storing instructions; and one or more processors that are coupled to the one or more memories and, when executing the instructions, are configured to: intercept a system call from a client application, wherein the system call comprises a request to connect to a target destination including an IPv4 destination; obtaining a file descriptor for a socket associated with the request to connect from the client application; replacing a network namespace for a socket from an IPv6 network namespace to an IPv4 transition network namespace; and causing a connection to be established from the client application to the target destination.
15. The system of clause 14, wherein causing the connection to be established comprises notifying the client application to continue with the request to connect following the intercepting, wherein the request to connect uses the socket with the modified network namespace to establish the connection.
16. The system of clauses 14-15, wherein the IPv4 transition network namespace can be used to establish egress connections from applications executing in an IPv6 namespace to destinations with an IPv4 address.

17. The system of clauses 14-16, wherein the client application operates exclusively in an IPv6 network namespace.
18. The system of clauses 14-17, wherein replacing the network namespace comprises accessing a file associated with the socket stored at a system kernel and replacing the network namespace associated with the socket with an IPv4 transition network namespace in the file.
19. The system of clauses 14-18, wherein a reference to the file is accessible in a file descriptor table in the system kernel.
20. The system of clauses 14-19, wherein an epoll table in the system kernel stores a pointer to the reference to the file.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for modifying system calls from a client application, the method comprising:
    intercepting a system call from a client application, wherein the system call comprises a request to connect to a target destination via a client socket;
    obtaining a file descriptor for the client socket associated with the request to connect from the client application;
    modifying a network namespace for the client socket; and
    causing a connection to be established from the client application to the target destination via the client socket.
2. The method of claim 1, wherein causing the connection to be established comprises notifying the client application to continue with the request to connect following the intercepting, wherein the request to connect uses the client socket with the modified network namespace to establish the connection.
3. The method of claim 1, wherein the target destination is an IPv4 destination, and wherein the network namespace for the client socket is modified to an IPv4 transition network namespace, wherein the IPv4 transition network namespace can be used to establish egress connections from applications executing in an IPV6 namespace to destinations with an IPV4 address.
4. The method of claim 1, wherein the client application operates exclusively in an IPv6 network namespace.
5. The method of claim 1, wherein modifying the network namespace comprises accessing the client socket associated with the file descriptor stored at a system kernel and replacing the network namespace associated with the client socket with an IPV4 transition network namespace in the file.

6. The method of claim 5, wherein a reference to the file is accessible in a file descriptor table in the system kernel.

7. The method of claim 6, wherein an epoll table in the system kernel stores a pointer to the reference to the file.

8. The method of claim 6, wherein the reference to the file comprises a memory location of the file.

9. The method of claim 1, further comprising:
prior to intercepting the system call, receiving a notification from a system kernel to intercept the system call based on a determination that an IPV4 destination is included in the request to connect from the client application, and wherein the client application is associated with an IPV6-only network namespace.

10. One or more non-transitory computer-readable media storing instructions that, when executed by one or more processors, cause the one or more processors to perform the steps of:
intercepting a system call from a client application, wherein the system call comprises a request to connect to a target destination via a client socket;
obtaining a file descriptor for the client socket associated with the request to connect from the client application;
modifying a network namespace for the client socket; and
notifying the client application to continue with the request to connect, wherein the request to connect uses the client socket with the modified network namespace to establish the connection.

11. The one or more non-transitory computer-readable media of claim 10, wherein the target destination is an IPV4 destination, and wherein the network namespace for the client socket is modified to an IPV4 transition network namespace, wherein the IPv4 transition network namespace can be used to establish egress connections from applications executing in an IPV6 namespace to destinations with an IPV4 address.

12. The one or more non-transitory computer-readable media of claim 10, wherein modifying the network namespace comprises accessing a file associated with the client socket stored at a system kernel and replacing the network namespace associated with the client socket in the file with an IPV4 transition network namespace.

13. The one or more non-transitory computer-readable media of claim 10, wherein the steps further comprise:
prior to intercepting the system call, receiving a notification from a system kernel to intercept the system call based on a determination that an IPV4 destination is included in the request to connect from the client application, and wherein the client application is associated with an IPV6-only network namespace.

14. A system comprising:
one or more memories storing instructions; and
one or more processors that are coupled to the one or more memories and, when executing the instructions, are configured to:
intercept a system call from a client application, wherein the system call comprises a request to connect to a target destination including an IPv4 destination via a client socket;
obtaining a file descriptor for the client socket associated with the request to connect from the client application;
modifying a network namespace for the client socket from an IPV6 network namespace to an IPv4 transition network namespace; and
cause a connection to be established from the client application to the target destination via the client socket.

15. The system of claim 14, wherein causing the connection to be established comprises notifying the client application to continue with the request to connect following the intercepting, wherein the request to connect uses the client socket with the modified network namespace to establish the connection.

16. The system of claim 14, wherein the IPV4 transition network namespace can be used to establish egress connections from applications executing in an IPV6 namespace to destinations with an IPV4 address.

17. The system of claim 14, wherein the client application operates exclusively in an IPV6 network namespace.

18. The system of claim 14, wherein modifying the network namespace comprises accessing a file associated with the client socket stored at a system kernel and replacing the network namespace associated with the client socket with an IPV4 transition network namespace in the file.

19. The system of claim 14, wherein a reference to the file is accessible in a file descriptor table in the system kernel.

20. The system of claim 14, wherein an epoll table in the system kernel stores a pointer to the reference to the file.

* * * * *

UNITED STATES PATENT AND TRADEMARK OFFICE
CERTIFICATE OF CORRECTION

PATENT NO. : 12,284,251 B2
APPLICATION NO. : 18/323133
DATED : April 22, 2025
INVENTOR(S) : Alok Tiagi It is certified that error appears in the above-identified patent and that said Letters Patent is hereby corrected as shown below:

In the Claims

Column 26, Claim 3, Line 62, please delete "IPV6" and insert --IPv6--;

Column 26, Claim 3, Line 63, please delete "IPV4" and insert --IPv4--;

Column 27, Claim 5, Line 3, please delete "IPV4" and insert --IPv4--;

Column 27, Claim 9, Line 13, please delete "IPV4" and insert --IPv4--;

Column 27, Claim 9, Line 16, please delete "IPV6-only" and insert --IPv6-only--;

Column 27, Claim 11, Line 32, please delete "IPV4" and insert --IPv4--;

Column 27, Claim 11, Line 34, please delete "IPV4" and insert --IPv4--;

Column 27, Claim 11, Line 37, please delete "IPV6" and insert --IPv6--;

Column 27, Claim 11, Line 38, please delete "IPV4" and insert --IPv4--;

Column 27, Claim 12, Line 44, please delete "IPV4" and insert --IPv4--;

Column 28, Claim 13, Line 3, please delete "IPV4" and insert --IPv4--;

Column 28, Claim 13, Line 6, please delete "IPV6-only" and insert --IPv6-only--;

Column 28, Claim 14, Line 16, please delete "obtaining" and insert --obtain--;

Column 28, Claim 14, Line 19, please delete "modifying" and insert --modify--;

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,284,251 B2

Column 28, Claim 14, Line 20, please delete "IPV6" and insert --IPv6--;

Column 28, Claim 16, Line 31, please delete "IPV4" and insert --IPv4--;

Column 28, Claim 16, Line 33, please delete "IPV6" and insert --IPv6--;

Column 28, Claim 16, Line 34, please delete "IPV4" and insert --IPv4--;

Column 28, Claim 17, Line 36, please delete "IPV6" and insert --IPv6--;

Column 28, Claim 18, Line 41, please delete "IPV4" and insert --IPv4--.